United States Patent
Harlapur et al.

(10) Patent No.: US 12,314,152 B2
(45) Date of Patent: May 27, 2025

(54) METHODS, SYSTEMS AND DEVICES FOR IMPLEMENTING REMOTE SERVICES

(71) Applicant: Dover Europe Sàrl, Vernier (CH)

(72) Inventors: Prabhas Harlapur, Bangalore (IN); Sunil Ingawale, Bangalore (IN)

(73) Assignee: DOVER EUROPE SÀRL, Vernier (CH)

( * ) Notice: Subject to any disclaimer, the term of this patent is extended or adjusted under 35 U.S.C. 154(b) by 0 days.

(21) Appl. No.: 18/564,880

(22) PCT Filed: Jun. 9, 2022

(86) PCT No.: PCT/EP2022/065770
§ 371 (c)(1),
(2) Date: Nov. 28, 2023

(87) PCT Pub. No.: WO2022/258789
PCT Pub. Date: Dec. 15, 2022

(65) Prior Publication Data
US 2024/0264781 A1    Aug. 8, 2024

(30) Foreign Application Priority Data

Jun. 9, 2021 (WO) ................. PCT/EP2021/065515
Jun. 9, 2021 (WO) ................. PCT/EP2021/065517

(51) Int. Cl.
*G06F 3/12* (2006.01)
*G06F 11/07* (2006.01)
(Continued)

(52) U.S. Cl.
CPC .......... *G06F 11/3055* (2013.01); *G06F 3/121* (2013.01); *G06F 3/1211* (2013.01);
(Continued)

(58) Field of Classification Search
None
See application file for complete search history.

(56) References Cited

U.S. PATENT DOCUMENTS 7,554,574 B2    6/2009  Shoji
2005/0006468 A1    1/2005  Fandel
(Continued)

OTHER PUBLICATIONS

International Search Report from corresponding International Application No. PCT/EP2022/065770, mailed on Nov. 18, 2022, 2 pages.
(Continued)

*Primary Examiner* — Haris Sabah
(74) *Attorney, Agent, or Firm* — Tucker Ellis LLP

(57) ABSTRACT

The invention relates to a system and method for providing remote services, the system comprising: at least one (industrial) printer (110) for use in a production site (140); at least one detecting device (110; 143) for real-time monitoring and detecting a functional parameter of the printer; an edge node comprising an edge computing device (120), the edge computing device comprising one or more processors (1102) configured by programming instructions on non-transient computer readable media; a cloud node comprising a cloud computing device (132), the edge computing device comprising one or more processors (1202) configured by programming instructions on non-transient computer readable media, the one or more processors (1102) being configured to: receive real-time data from the printer and/or detecting device; process and analyze received real-time data and compare with internally stored data to generate a response to the received data; transmit the response to the at least one printer; transmit the response and received real-time data to the cloud node; the cloud computing device being configured to: process and analyze the real-time data from the printer and the response from the edge computing device by comparing them with historical data and generate a response with respect to the historical data; and provide the response to a user and/or the edge node.

26 Claims, 15 Drawing Sheets

(51) Int. Cl.
  *G06F 11/30* (2006.01)
  *H04L 1/00* (2006.01)
(52) U.S. Cl.
  CPC .......... *G06F 3/1229* (2013.01); *G06F 3/1282* (2013.01); *G06F 3/1285* (2013.01); *G06F 11/0733* (2013.01); *G06F 11/0751* (2013.01); *G06F 11/0793* (2013.01); *G06F 11/3013* (2013.01); *H04L 1/00* (2013.01)

(56) References Cited

U.S. PATENT DOCUMENTS

| | | | | |
|---|---|---|---|---|
| 2013/0114110 | A1* | 5/2013 | Doi | H04N 1/405 358/3.06 |
| 2017/0237736 | A1* | 8/2017 | Eber | H04L 63/0876 726/4 |
| 2018/0007215 | A1* | 1/2018 | Zakharov | H04N 1/00832 |
| 2021/0081149 | A1* | 3/2021 | Kaneda | G06F 3/121 |
| 2021/0373826 | A1* | 12/2021 | Sueshige | G06F 3/1288 |

OTHER PUBLICATIONS

Qiu, Tie et al., "Edge Computing in Industrial Internet of Things: Architecture, Advances and Challenges," IEEE Communications Surveys & Tutorials, vol. 22, No. 4, Jul. 14, 2020, 28 pages.
International Preliminary Report on Patentability from corresponding International Application No. PCT/EP2022/065770, mailed on Sep. 19, 2023, 25 pages.

* cited by examiner

METHODS, SYSTEMS AND DEVICES FOR IMPLEMENTING REMOTE SERVICES

TECHNICAL FIELD

The disclosure relates to methods, systems and devices for implementing remote services in general and implementing one or more of remote troubleshooting, configuration, setup, forwarding instructions, and/or repairs of industrial print environment, in particular.

BACKGROUND

Repair Data Analytics is a key outcome of any remote servicing solution, which provides insights about a device, e.g., an industrial printer. In the industrial printer environment, the analytics may need to present time printer status and/or sensor information along with historical data or together to put data through analytics engine.

The analytics can be done over the cloud computing unit as the computing scale can be expanded, but it may come with network cost and delay, and depends on the network availability to be able to push all the necessary data.

Cloud computing and analytics is an emerging technology area of the information technology. Cloud computing allows to build and deploy large scaled, distributed compute, storage and memory on demand.

In the current days, processing of the data on the cloud has become the de-facto way to build the analytics and data computation.

The cloud computing has evolved further to so-called "Edge Computing". Edge computing is a distributed computing model. The computation and data storage are brought closer to the location where it is required. This improves response times and save bandwidth. In edge computing, a gateway is normally employed; an edge gateway serves as a network entry point for devices typically talking to cloud services. They are also often able of providing network translation between networks that use different protocols.

While the cloud computing may be capturing "everything" (i.e., whatever forwarded to it) and deal with it later, the edge computing takes only what is useful and meaningful, process what it can and then send it to the cloud. Normally, in edge computing, a gateway (edge node comprising an edge computing device) is arranged in the communication path of the device(s), which acts as the first computing and processing element, and the cloud, to which data is getting pushed from the gateway, acts as a second element the ease of implementing remote services solution. The edge may also provide offline (in the sense that connection with cloud is not possible) capability to store the data and computing environment. Moreover, the edge computing can handle a large amount of the computation power and on demand, and it is possible to plug-&-play increase the memory and processing power when needed without disturbing the production. Preferably, it can be a hot-pluggable unit.

Edge computing may also add security barriers, i.e., preventing direct internet connection with the connected devices. High level of the security standards can be implemented inside the gateway where the bandwidth is not sufficient to update the devices while looking the direct device connectivity to cloud without gateway.

SUMMARY

The disclosure presents various systems and methods that separately or together act as a solid foundation for an effective remote services solution. One objective of the disclosure is to remedy ineffective way of data analytics in a system, especially a time-critical environment, and delayed response due to network issues.

The system disclosed herein is configured to be a highly responsive analytical system to act on the analyzed data and quickly communicate to either device or cloud node.

Although the cloud analytics may be sufficient, it has many constraints as the system has always to be online. With edge analytics approach, the system does not have always to be online to perform analytics data.

In a printing environment, the methods including remote services described herein decreased load on the printer as the edge computing monitors the events, which may be processed via secondary storage on the printer not hampering the activities of the production printer. In case of direct query, for example, the printer may achieve vast performance achievements as it will not have to address the query and printing process at same time. This mechanism will improve the efficiency in the production site printer installation.

Moreover, the system of remote services described herein allows acting quickly in the production line to prevent the damage due to network loss or delayed network communication.

According to remote services described herein, staged analytics (hybrid) approach splits the analytics strategy into two main categories: rapid reactive analytics and proactive analytics. Reactive analytics may be executed on the edge computing node where some functions are executed. Proactive analytics may be executed at a first level on the edge computing node and in a second level in cloud computing node. The disclosure describes retrieving substantially all historical data and analyses at large scale in cloud computing node and bringing pro-active measures to the printer and thus preventing errors before occurring.

Implementing the teachings of the disclosure, the edge gateway (computing node) provides additional level of security barrier which can help to prevent accessing the printers connected to the network. Having only outbound connection from the printer to the edge gateway will enhance its security level by not allowing access to the system with no inbound ports, which can be easily configured on the gateway and directly on the printer.

The edge gateway, as implemented in accordance with the remote services described herein, provides offline data capability, which implies storing printer events, e.g., in case of communication failure with the cloud and again synchronizing them with cloud once the network is back at its normal state. The gateway may thus maintain all printer events in an offline data storage during network failures, which prevents the connectivity between the cloud and the gateway. Therefore, the invention also provides effective way of handling offline data received from the device/printer.

Consequently, the methods and systems of for implementing remote services described herein allow for real-time/near real-time analyze, e.g., of diagnostic and/or maintenance data and/or configuration details from an industrial printer connected to a gateway computing node for an effective way to reduce the downtime for printer and quickly take actions on the printer based on the outcome of the insights coming as result of analytics. This reduces over-all response time.

The system according to the remote services described herein comprising industrial printer, which can use the edge gateway and cloud computing node together provides a remote service solution offering useful insights related to diagnostics and maintenance aspects of the industrial printer.

According to one embodiment, a remote service system represents an industrial printer/device, edge gateway computer device and cloud computing node. The industrial printer/device is under normal operation condition may be a self-running device, which keeps its own local storage for logging all the sensor, diagnostic and maintenance data either via log file or printer events.

In one embodiment, the gateway is configured to communicate with the device/printer in forward only manner. The printer will be providing the details on current and past status of its condition. Thus, the printer communication in the forward only manner will only act as data provider and does not accept any commands. This prevents any modification to the printer, which will help preventing, e.g., any unauthorized update on the printer/production configuration.

For these reasons a system is provided, comprising: at least one (industrial) printer for use in a production site; at least one detecting device for real-time monitoring and detecting a functional parameter of the printer; an edge node comprising an edge computing device, the edge computing device comprising one or more processors configured by programming instructions on non-transient computer readable media, a cloud node comprising a cloud computing device, the cloud computing device comprising one or more processors configured by programming instructions on non-transient computer readable media, the one or more processors being configured to: receive real-time data from the printer and/or detecting device; process and analyze received real-time data and compare with internally stored data to generate a response to the received data; transmit the response to the at least one printer; transmit the response and received real-time data to the cloud node. The cloud computing device being configured to: process and analyze the real-time data from the printer and the response from the edge computing device by comparing them with historical data and generate a response with respect to the historical data; and provide the response to a user and/or the edge node. Preferably, the edge node is inside the production site. The cloud node is arranged remotely. In one embodiment the functional parameter comprises one or several of diagnostic data, configuration data, maintenance information, fault/error/warning condition or quality parameter. The response may comprise a remote service solution. In one embodiment, the edge node is configured to provide instructions directly to the printer device for reconfiguring the printer device and thus achieving near real-time problem solution.

In one embodiment, the edge computer device may comprise a processing engine, a device diagnostics aggregator and a validator. The processing engine comprises a telemetry processor and an algorithm processor, wherein the telemetry processor is configured to: handle publishing of the printer device data to cloud node and to map printer device data to right printer device when receiving from multiple printers; to pass all the processed data to cloud node; for communicating with one or more printer devices and/or detecting devices; collect printer diagnostics, status and/or maintenance information; receive set of data for each individual system in a non-blocking mode; analyze the received data via a data query system; take suitable action and builds an event/notification; and transmit event data is sent to cloud node.

In one embodiment, the cloud node comprises a gateway, an analytics engine and a database. The database may be configured to store historic data from the printer devices, real-time data received from the edge node and the analytics engine comprises a computer for running a decision and action application or an AI based application.

According to one embodiment, the printer device is provided with a label configured to be scanned by a user, translated to instructions allowing the user obtain access to a knowledge database in the cloud node. The label may comprise a two-dimensional code and comprises a unique id of the printer device and/or additional error codes and/or diagnostic information. The edge node may be configured to transform a fault/error/warning into a 2D-code and sent it to a user via a message, wherein the 2D-code is scanned, and reconfiguration instructions are downloaded to the industrial printer automatically.

In one embodiment the system may comprise one or several vision systems configured to record an image of a printout. The system may comprise an arrangement configured to analyze the image from the vision system to detect a quality parameter. The edge node may be configured to with respect to the outcome of the analyze of the provide instructions to the printer, a user and forward the instruction and the outcome of the analyze to the cloud node.

In one embodiment, the cloud node based on multiple instances analyzes and/or generates proactive message to a user to make corrective actions and/or generate information to educate user to handle the printer device correctly.

The disclosure also relates to a method of servicing an industrial printer. The method comprises: receiving by an edge node real-time information from the industrial printer; processing the data from the industrial printer by the edge node, the processing comprising: calculating based on the printer historical data stored in the edge node and real-time printer information; validating the real-time information; generating instructions for configuration of the industrial printer by the edge node based on a result of validation; and/or transmitting the instructions to the printer and/or an operator of the industrial printer; transmitting real-time information and instructions to a cloud node; processing by the cloud node the real-time information and instructions; and generating further solution instructions by the cloud node and storing real-time information, instructions and further solution instructions in the cloud node. The real-time information and instructions are forwarded to cloud node using digital codes comprising reference lookup on the cloud node or the code itself represent a service issue and solution. In one embodiment, the real-time information comprises sensor and/or diagnostic and/or quality parameter and/or configuration data. The method may also comprise the further steps of: scanning a label on the industrial printer, the label comprising a unique id of the industrial printer and/or additional error codes and/or diagnostic information; processing and forwarding the scanned image to the cloud node; receiving instructions based on the received scanned information and historical information stored in the cloud node. In one exemplary embodiment the data transmitted between the printer device and the gateway node and the cloud node comprises one or several of: Real-time or near real-time data comprising:

Information that is available from the printer device or edge node to represent a current state; or Historical data: Information representing an earlier status of the printer device or edge. The data may further comprise one or several of: sensor information; diagnostic data; configuration data; or operator Usage data.

The disclosure also relates to an edge node for processing functional parameters of an industrial printer and providing reconfiguration instructions based on processed functional parameters. The edge node comprises an edge computing device, the edge computing device comprises one or more processors configured by programming instructions on non-transient computer readable media. The edge computing device further comprising: a processing engine, a device diagnostics aggregator and a validator; and the processing engine comprises a telemetry processor and an algorithm processor.

The disclosure also relates to a cloud node for processing functional parameters of an industrial printer and providing reconfiguration instructions based on processed functional parameters. The cloud node further comprises a gateway, an analytics engine and a database.

BRIEF DESCRIPTION OF THE DRAWINGS

In the following reference is made to the attached drawings, wherein elements having the same reference number designation may represent like elements throughout.

DETAILED DESCRIPTION

The "Cloud computing node", "cloud computer", "cloud node" or "cloud" as the terms are used herein, are to be broadly interpreted to include an on-demand availability of computer system resources, such as data storage and computing power, without direct active management by a user and may include data centers available to many users over the Internet.

The "Edge computing node", "edge computer", "edge node", or "edge" as the terms are used herein, are to be broadly interpreted to include a distributed, normally open IT architecture that features decentralized processing power, enabling mobile computing and Internet of Things (IoT) technologies. In edge computing, data is processed by the device itself or by a local computer or server, rather than being transmitted to a data center. The edge node may comprise of or include an "edge gateway", which as the term is used herein, is to be broadly interpreted to include a gateway, which serves as a network entry point for devices typically talking to cloud services. Examples may include routers, routing switches, Integrated Access Devices (IADs), multiplexers, and a variety of Metropolitan Area Network (MAN) and Wide Area Network (WAN) access devices.

An "industrial printer" as the term is used herein, is to be broadly interpreted to include a heavy duty, durable and fast printer device for use in a production line. The production line may comprise one or several printer devices, such as but not limited to, Continuous Inkjet Printers (CIJ), Laser Marking Systems, Thermal Transfer Over-printers (TTO), Thermal Inkjet Printers (TIJ), as well as Case Coding Printers and Print & Apply Labeling Systems (LPA).

In an industrial printing environment, numerous printers are typically configured to simultaneously print information on various types of items. One example of an industrial printing environment may be the printing of labels on various types of packages or consumer goods. Consumer goods require a great deal of product identification (e.g., expiry dates, traceability data, etc.). The information to be printed may vary from one item to another, from one batch of similar items to another, from one site or time of manufacture to another, and/or from one type of print technology to another.

A "printer device" as the term is used herein, is to be broadly interpreted to include a device for transferring print data to an information carrier.

The term "near real-time" as used herein, is to be broadly interpreted to be understood as define a time range of micro-second to millisecond or a fraction of second and the action to be perceived that it is almost real-time.

Figure 1:
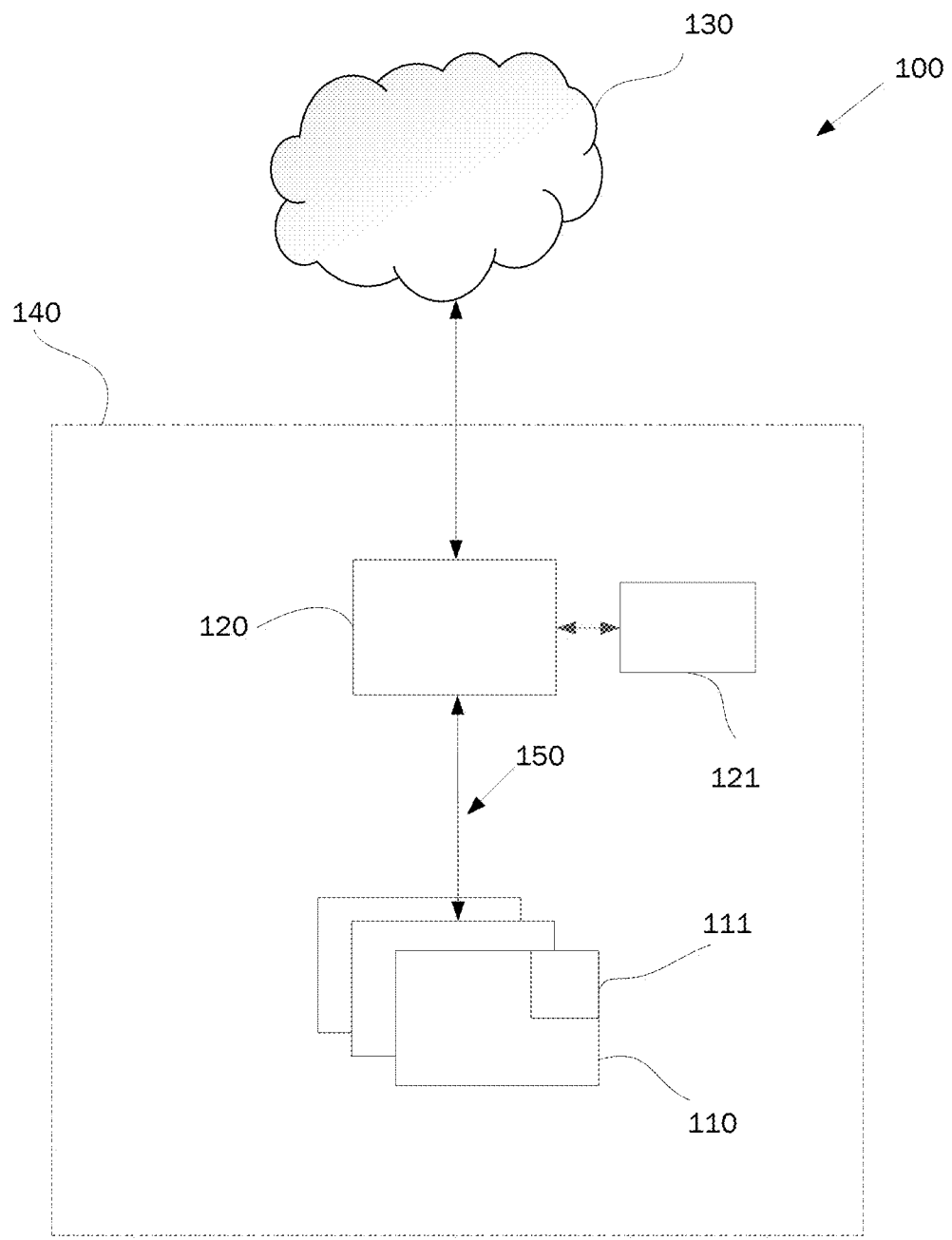
FIG. 1 is a diagram of an system in which methods and systems described herein may be implemented.

FIG. 1 illustrates an example of a remote service environment, according to a first aspect of the disclosure. The system 100 comprises one or several client devices 110, an edge gateway device (gateway) or edge computing device 120 and a cloud computing system 130. The client devices 110 are connected to and communicate with the gateway 120 inside a production site premises 140, and the gateway 120 is connected to the cloud computing system 130. The client device 110, which according to this example may be an industrial printer, e.g., in a production line, may comprise one or several sensors 111, each of which has the capability to output diagnostics data on demand, continuously or periodically. The data may be output to a file, a database, written to a memory and/or transmitted over the communication network. The sensors may also support event publishing regarding, e.g., faults and warnings to any subsystem connected to it. The edge gateway 120 may be capable of hosting and communicating with multiple connected printers via a network connection 150. The network connections 150 may comprise wireless, wired or telecom-based communication. The edge gateway 120 is installed to minimize the overhead of the printer (and other devices in the production site) to directly communicate with the cloud computing system 130 over a network. The edge gateway (and edge computer itself) may be responsible to communicate with the printer and/or sensors in an optimized or suitable way to obtain diagnostics, status and maintenance information from the printer or the sensor 111 continuously or periodically.

Integrated or in communication with the edge gateway may be an edge computer or processing arrangement 121 for processing data from the printers and/or sensors.

Figure 2:
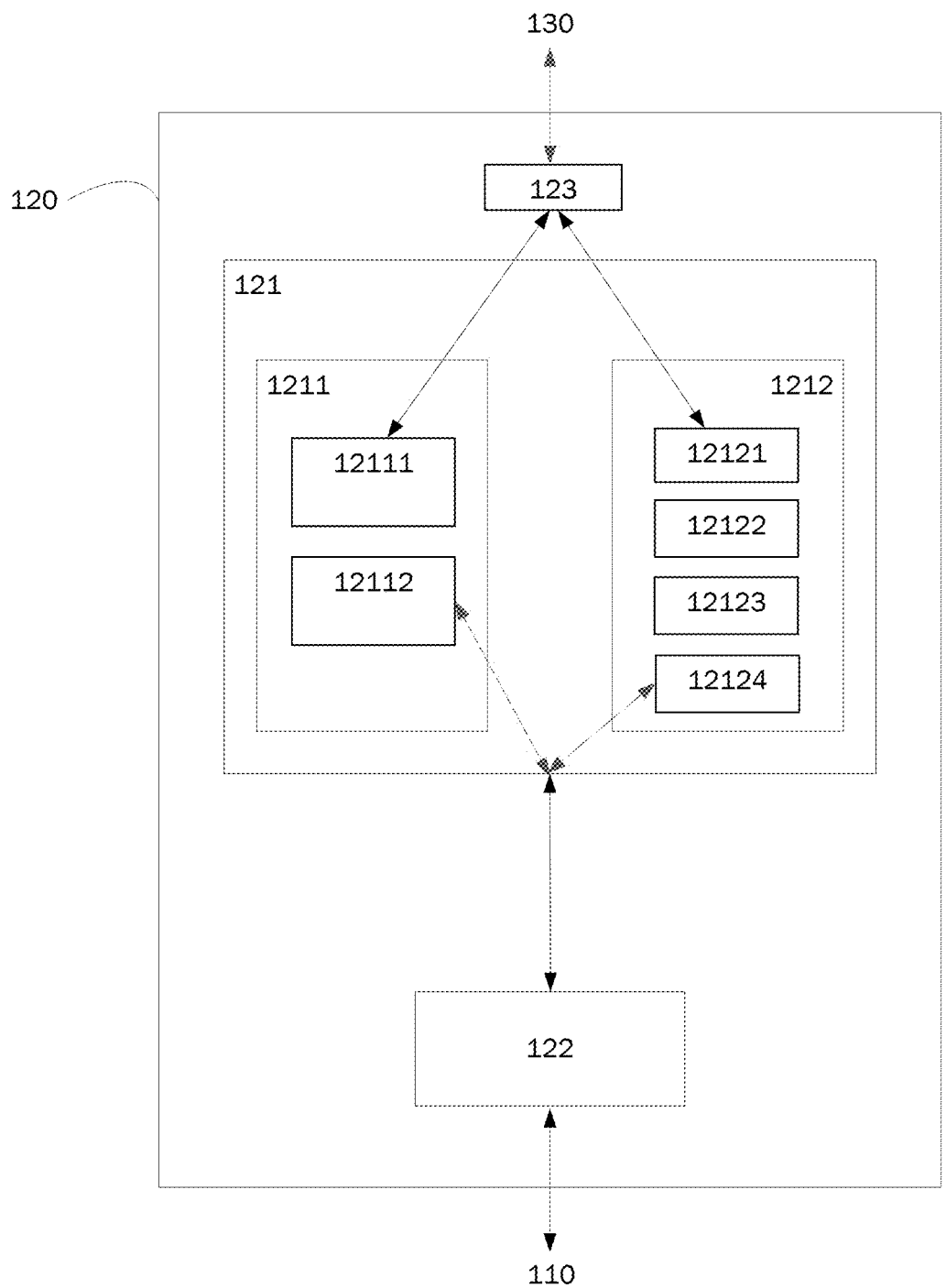
FIG. 2 illustrates a edge gateway setup, according to one embodiment.

FIG. 2 illustrates schematically an embodiment of the edge computer (gateway) 120 and plurality of its subsystems and plurality of connected systems. The internal components of edge computer 120 may hold multiple components to process the data from the devices, in this case the industrial printers. The schematic edge computer 120 of this example comprises blocks: a processing engine 121, a device diagnostics aggregator 122, and an interface 123.

The processing engine 121 may comprise a telemetry processor block 1211 and an algorithm processor block 1212. In one embodiment, these blocks may also be combined.

The telemetry processor block 1211 may comprise two processing units:
- Telemetry message validator processor 12112: which is configured to mainly validate all the incoming data from all the printers. This unit runs multiple sub virtual units each corresponding to each of the printer. Each sub virtual unit may be responsible for handling each of the printer messages. Thus, this unit maps all device data to right printer when receiving from multiple printers.
- Telemetry message processor 12111: which is responsible for processing the incoming message and preparing the data for cloud push. This unit also discards any stale data which is not needed to be processed on the cloud. Telemetry message processor 12111 handles the publishing of the device data to cloud via the interface 123 The interface 123 handles communication and information exchange with the cloud 130.

The diagnostics aggregator 122 may be responsible for communicating with one or more printers 110 and/or sensors 111 and gathering printer diagnostics, status and/or maintenance information without overloading the printer activities.

The processing engine block 121 is responsible for collecting all the data from aggregator and processing in two parts: One for telemetry data 1211 and another for handling analytical data 1212.

As the edge computer is intendent to be installed on the same network as the device/printer in the production site or a nearby location, the edge computer can process data with minimal or no network latency compared to the cloud and respond back to the printers to take suitable set of actions, which leads to insights of the system to help better remote service of a printer. The edge gateway could be either at the same network or a nearby location outside of the cloud which has minimal or no network latency.

The edge computer installed between the cloud and the printer, may also act as a filter for discarding any stale data or corrupted data which is sent over the cloud, which increases the data size without adding value to analytics.

The cloud computing system 130 also extends the analytics of the data to post edge computing analytics.

The two parallel processing units may handle the publishing of the printer data to the cloud via the validator 1212 based on the mapping to each of respective printer. All the processed data may be passed to the interface 123 to further transmission to the cloud computing system.

The algorithm processor block 1212 may comprise blocks of event builder 12121, algorithm executor 12122, data analyzer 12123 and data query system 12124. The algorithm processor 1212 may keep all its processors separate to not block the telemetry processor 1211. The data query system 12124 receives the set of data for each individual system in a non-blocking mode. The data analyzer 12123 analysis the received data via the data query system 12124 and passes it to the algorithm executor 12122 to execute the process data of the given data set. Once the data is processed then it takes suitable action and builds an event/notification via the event builder 12121. Finally, the event data is sent to cloud via the interface unit 123.

Figure 3:
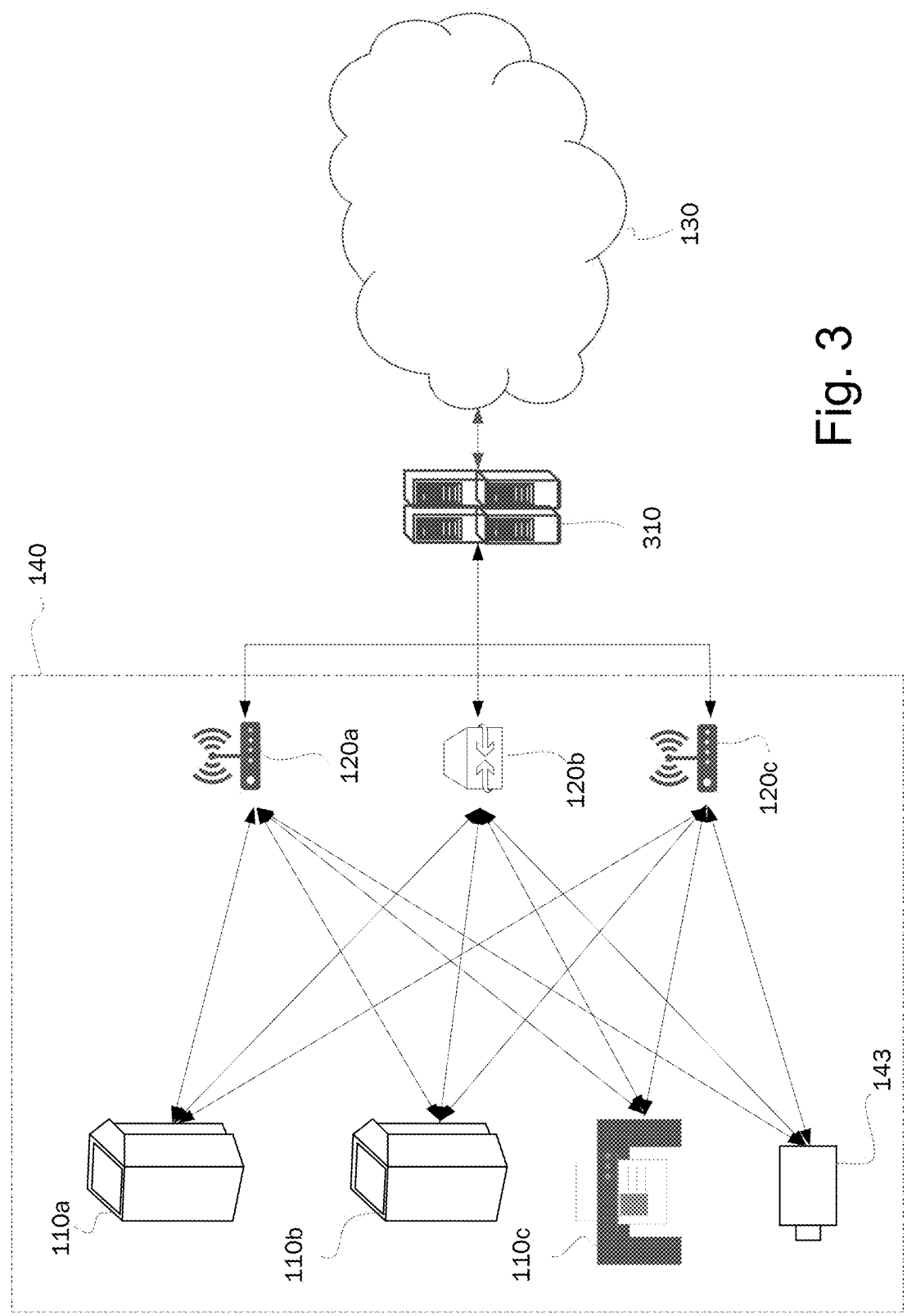
FIG. 3 is a schematic diagram of connection of devices to gateways and cloud according to one embodiment.

FIG. 3 is a schematic diagram of one embodiment in which a number of wired and wireless gateways 120a-120c connect to several devices, such as (industrial) printers 110a and 110b, offset printer 110c and monitoring device 143. Each device may connect to one or several gateways, depending on, e.g., type or quality of service needed, priority, availability, dedication, etc. The gateways may connect to cloud computing 130 through an application server or internet server 310.

Figure 4:
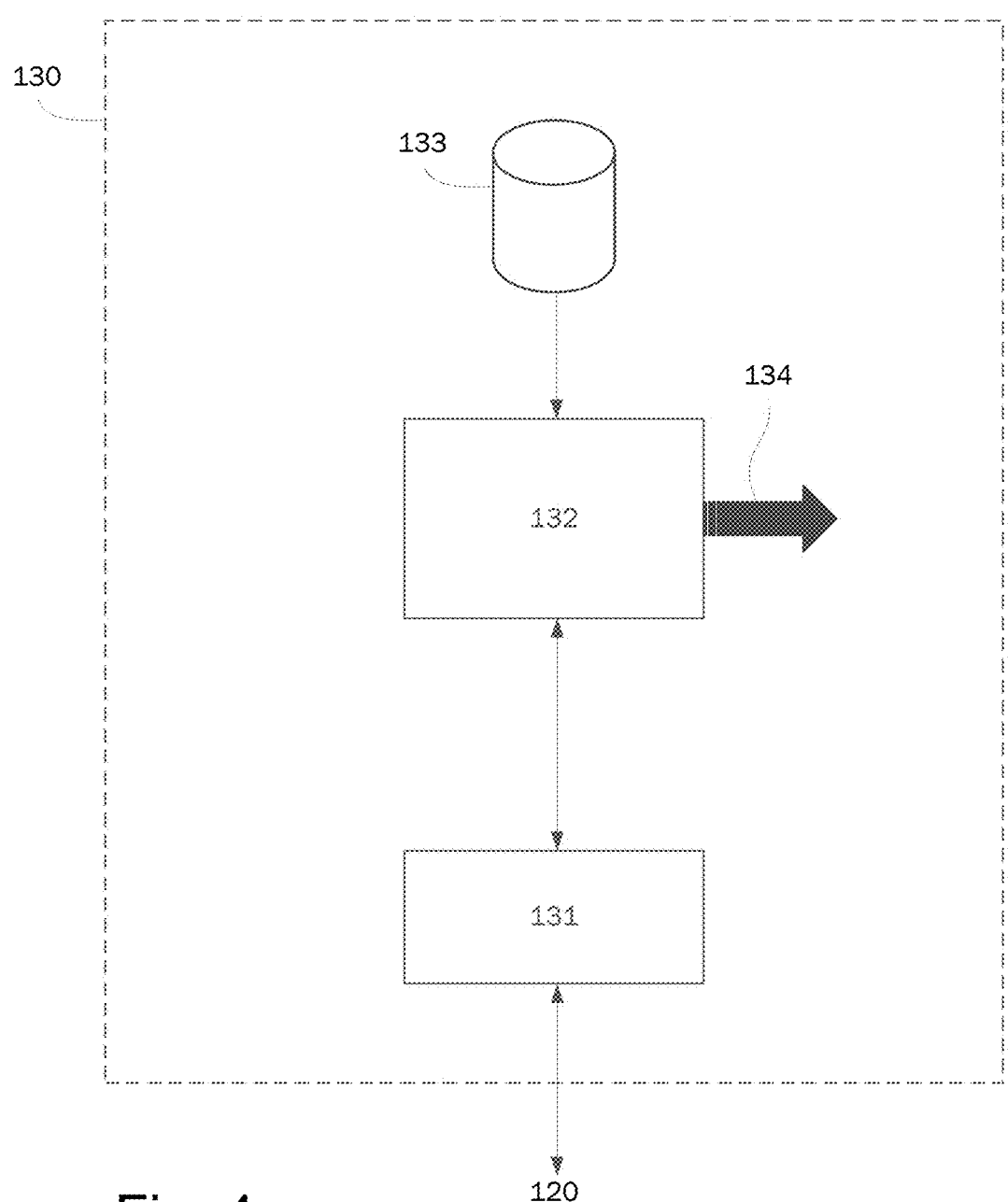
FIG. 4 illustrates a cloud setup, according to one embodiment.

FIG. 4 illustrates a schematic view of the "cloud computer" or in short cloud 130. The cloud 130 may comprise an interface or gateway 131, an analytics engine 132 and a database 133. The database 133 may store historic data or any relevant data for one or several applications. Realtime data received from the edge gateway is provided from the cloud gateway 131 to the analytics engine 132. The analytics engine may comprise a computer, e.g., running a decision and action application, an AI based application, etc. The cloud computing 130 may consist of several layers:
- Infrastructure as a Service (IaaS) provides cloud infrastructure in terms of hardware, such as memory, processor speed, etc.,
- Platform as a Service (PaaS) provides cloud application platform for the developers,
- Software as a Service (SaaS) provides cloud applications which can used by a user directly without installing additional software on the local system. The application remains on the cloud and it can be saved and edited in there only.

One or several of these layers may be used by the system 100 depending on the analytics needed.

As mentioned earlier, individual stream level analytics is done on the edge computer and aggregated analytics is done on the cloud 130. Thus, over-all insights will be outcome of combination of both analytics done at the edge computer and cloud level. Finally, alerts 134 may be generated at the end of the phase two, i.e., analytics of the cloud.

Figure 5:
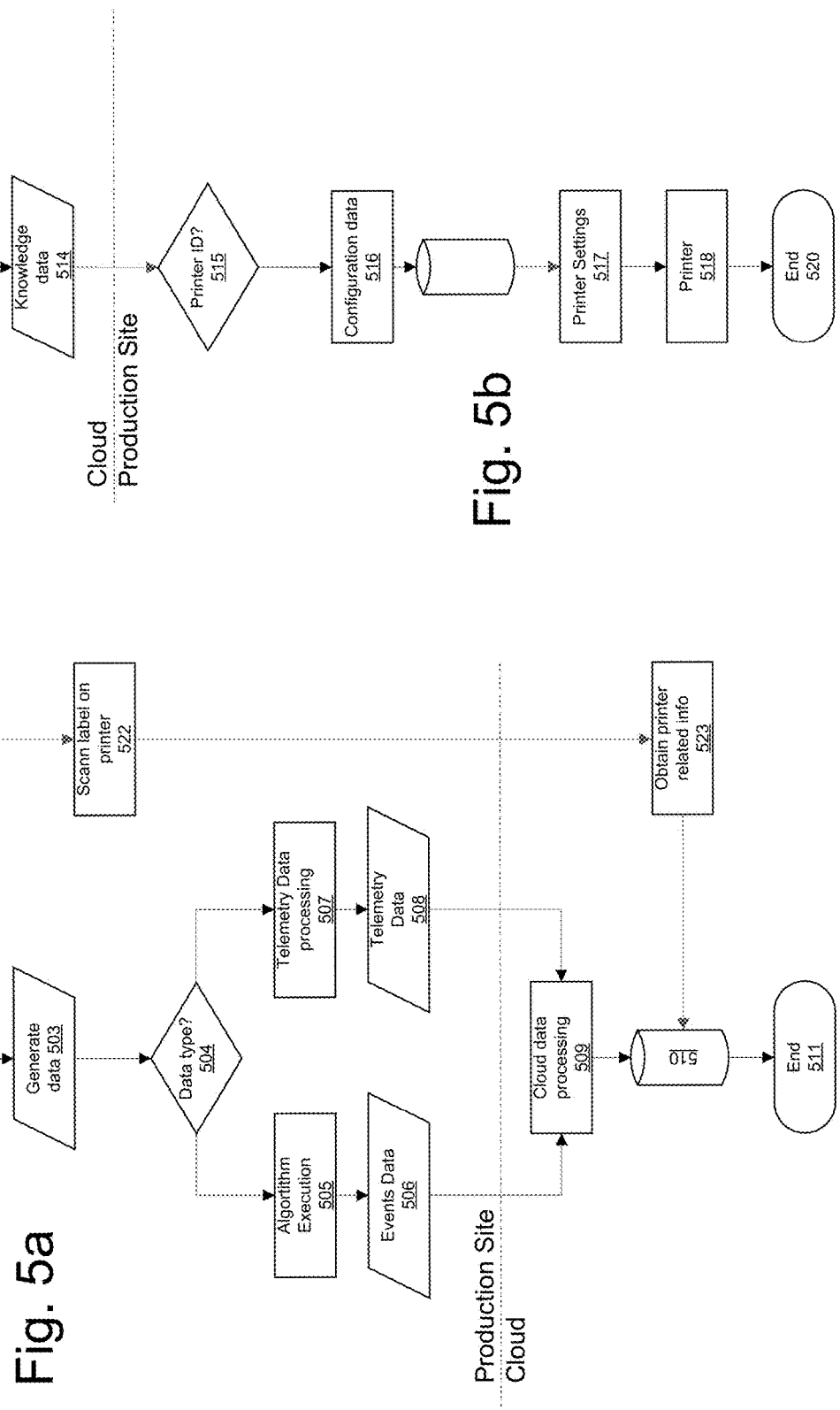
FIGS. 5a and 5b illustrate flow charts of the events for exemplary remote services from a device to edge node, and edge node to cloud node according to one embodiment.

FIGS. 5a and 5b illustrate example flow charts for events of the remote services from device to edge computing, from edge computing to cloud computing and back from cloud to the device via edge. FIG. 5a also depicts the scanning of 2D-code (two-dimensional code) by a user and accessing the relevant information from the cloud after.
- 502: The printer device's operation starts;
- 503: The printer device itself or a monitoring device generates operation related data;
- 504: The data is received by the edge gateway, which determines the data type;
- 505: In the algorithm execution, the data is processed;
- 506: When the data is processed, a suitable action may be taken and an event or notification is generated via the event builder;
- 507: If the data is telemetry data, the telemetry message processor handles the device data;
- 508: The telemetry message validator processes and maps all printer data to a corresponding printer when receiving data from multiple printer devices;

509: On the cloud side, data from algorithm execution and telemetry processing are forwarded to cloud data processing, which processes data and stores/data fetches result in cloud database;

Alternatively:

521: An operator/user may use a scanning device of a mobile terminal;

522: Scan a label on the printer. The label comprising a barcode or QR-code;

523: The barcode/QR-code provides all information about the printer which is forwarded to the cloud.

From cloud's side:

513: The cloud computer processes the data and generates a response;

514: The response is transmitted to the printer device (through edge computer);

515: The data provided from the printer device may include a unique identification; the response from cloud back to the device is thus checked for the device identification, such as device serial number, based on which the printer device is identified;

516: Based on the identified printer device, configuration data is identified;

517: Printer settings are generated; and

518: Provided to the printer device.

Figure 6:
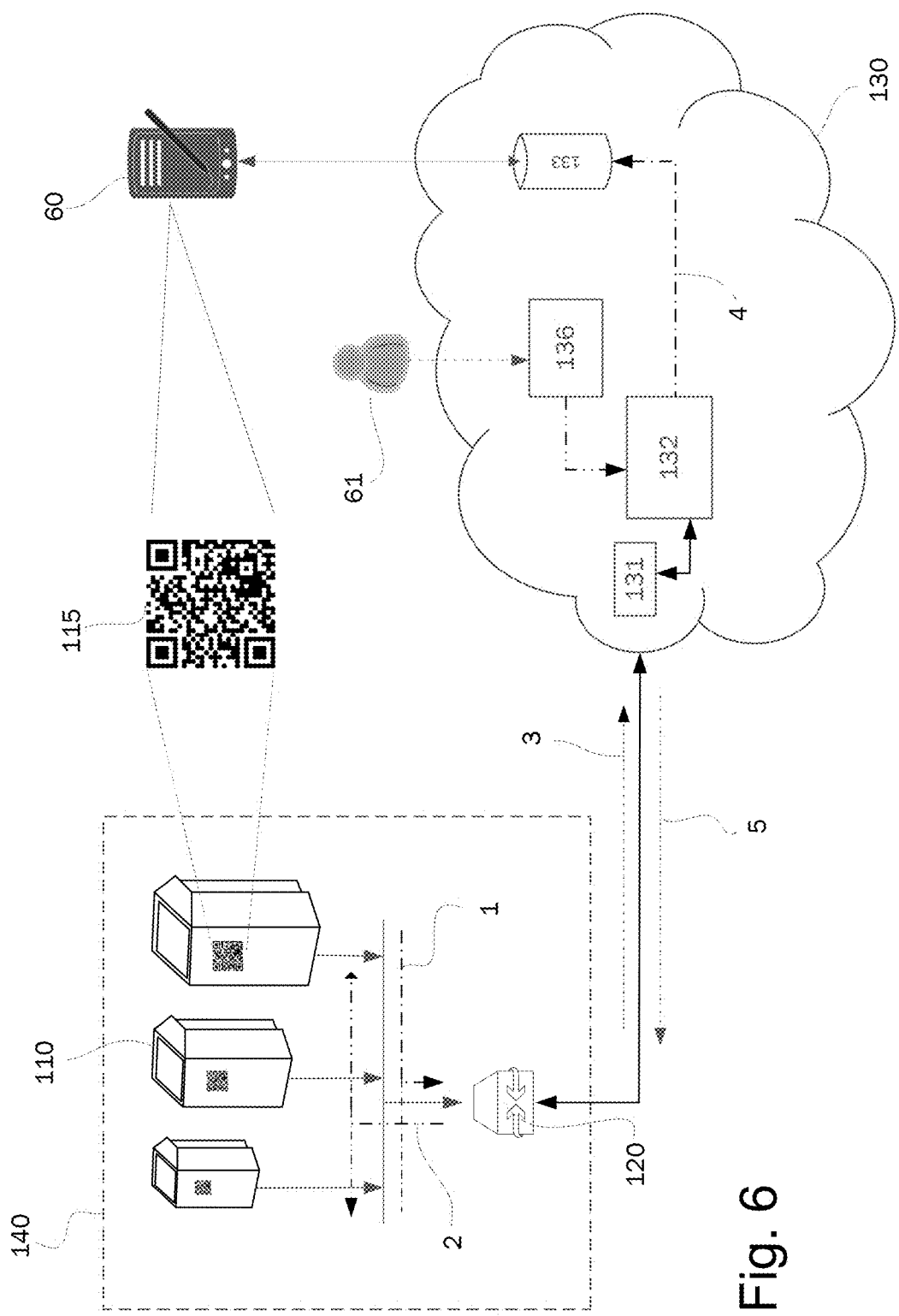
FIG. 6 illustrates an example of 2D-code linkage from a printer to cloud node according to one embodiment.

In the following, several implementations of the system 100 are detailed:

FIG. 6 illustrates one system implementing the methods including remote services described herein. FIG. 6 discloses basically the remote actions on a printer with the help of the edge gateway/computer. Based on the knowledge and second stage analytics done at the cloud, a user can initiate an action on the printer, which may be forwarded to the gateway as a request. The gateway may validate the input data coming from the cloud and take appropriate action on the printer with a set of correct instructions.

Several printer devices 110 arranged in a production site 140 are configured, e.g., to produce marks on various types of information carrying material (not shown). The printer devices may comprise any type of industrial printers with ability to mark goods. The printer devices 110 may comprise one or several of digital printers, ink-jet printers, screen printers, embossing machines, flexographic printing machine, letterpress printing machines, offset printers, laser printers, wireless printers, 3D printers, thermographic printers, electrostatic printing machine, pad printers, rotogravure printing machines, etc. The information carrying material may comprise a substrate, packaging material, etc.

In the following, reference numbers in parentheses relate to flow lines/arrows.

Multiple sensor parameters may be collected (1) in near real-time from the printer devices using internal or external sensors (not shown) and provided to the edge gateway 120; line (1). The sensors may collect information about the condition of each printer device, subsystems or parts of the printer devices. The data may comprise diagnostic and/or condition parameters such as faults, errors, warning condition of the printer devices or its subsystem.

As the gateway 120 is installed inside the production site, the gateway will have access to the information in near real time. Once the information is available to the gateway, it can perform near real-time analytics, which is achieved faster than if performed by a cloud computer due to network latencies. The outcome of the analytics can quickly be provided (2) back to the production line or printer device or operator to take actions. In one embodiment, the printer device with an issue may be reconfigured automatically to overcome the problem by receiving configuration, reset or similar instructions.

According to this embodiment, each printer device 110 is provided with a readable label 115 on the printer device. The label is preferably provided in a position visible and easy to access by a user/operator. The label can be used to gain access to a knowledge database 133 stored in the cloud 130.

The readable label may comprise 2D code or any uniquely identifiable information such as 1D code, URL's, RFID, OCR's, processable images and also be plain text information. The label may be associated with an initial uniform resource identifier (URI) including an identifier of a product of an enterprise, the URI triggered by the user scanning a label that is physically or digitally associated with a specific instance of the product or any object. Moreover, a "label" (as used in this document) also refers to (or constitutes) a "tag". The label can be a bar code, a data matrix, a Quick Response (QR) code, alphanumeric code, an RFID (Radio Frequency Identifier) tag, an NFC (Near Field Communication) tag, etc. An NFC tag can be used to exchange data or create digital association between objects and devices, typically by a gesture of placing an NFC tag near a phone or vice versa. A user can initiate creation of a URI using various techniques. For example, a user device can interact with a product connection point, for example by scanning a QR code that encodes a URI using a mobile device's camera. As another example, a user can tap a mobile device to an NFC tag. The mobile device can then use installed software to extract the URI from the QR code and transmit the URI to a server. Scanning or tapping a product connection point instead of typing one provides convenience to the user as the scanning typically requires less effort and is less error prone than typing.

In addition, the packaging on many products already includes various codes, so allowing a user to scan a code provides a convenient way for users to retrieve relevant information. The mobile device (or other suitable computing device) can then send the code to a computing system that contains information relevant to the code. The code can include product related information, such as a product identifier, and additional parameters that may be used for dynamically creating URIs. The code can be encoded with an encryption key and successful decryption determines the destination web page constructed. The code can include a product connection point identifier, for example whether the technology is a QR code or an NFC tag. The code can include an encrypted code that generates at each interaction with the product connection point. In some implementations, event data such as every interaction (or a subset of the interactions) and related information, such as attributes, parameters or elements related to the connection point, the user device, or the digital destination are tracked, recorded and stored by the enterprise.

In some embodiments, an app on a cellphone can be used to retrieve consumable information and authenticity information by scanning a unique code on the printer or using NFC. Each of the parts and consumables are very important part of a printer and each part comes with a number of important information, such as manufacturing date, authenticity, hazardous information and real-time stock and availability information. For example, for an CIJ printer information about CIJ Ink Cartage, date of manufacturing, authenticity, location available for quick order, ink details, hazard information and ink autonomy, etc. may be displayed.

In some embodiments the app can be used to retrieve spare part info and authenticity, the information may include CIJ filter kit, date of installation, production run, authenticity, location available for quick order, availability information, etc.

In some embodiments, printer maintenance info for Field Service Engineer (FSE) may be retrieved when visiting the customer site, as it is important to know some key information of the printer under diagnosis to quickly obtain information, such as printer type, purchase information, warranty, service plan information, maintenance information, location, etc.

If an operational problem arises, a user or an operator of the printer device(s) can scan the label 115 using a terminal 60 and access the knowledge information about the specific individual printer device. This allows to quickly access information about the (previous) diagnostics about the faults and errors sent to the cloud by the gateway 120. The gateway acts as a link for accessing the knowledge base with the help of data mapping between the printer issues and resolution steps. The gateway 120 forwards (3) its analytics and diagnostics to cloud 130 for further analyses and processing, as described earlier. The 2D code may comprise unique identity of the printer device. The knowledge base on the cloud will provide the error code information depending on the unique code of the printer. It can also provide relevant additional error codes and diagnostic information.

In this embodiment with combined edge/cloud, the remote actions on the printer device are carried out with the aid of the edge gateway. Based on the knowledge from the second stage analytics done at the cloud computer, a help desk or an (external) operator 61 can initiate the action on the printer which will be returned to the gateway 120 from the cloud via the gateway connection. The actions may be input via an interface 136. The data processor 132 of the cloud computer applies analytics on the obtained data, perform analytics, as described earlier, and provides (4) combined edge computer analytics and cloud analytics to the cloud database 133. The analytics may also consider actions from the help desk 61 or similar. The actions may for example include update printer configuration, properties and fields. The gateway will then validate the input data coming (5) from the cloud computer and may take (2) appropriate action on the printer with proper instruction set generated by gateway. A cloud gateway 131 may be employed for communication between the edge gateway and the data processor 132. The user may also connect to a remote troubleshooting knowledge system and receive instructions through, e.g., messaging, document, video or live chat to resolve a problem.

In one embodiment, the gateway 120 (or any component of system 100) may transform the fault/error/warning into a 2D Code (2D QR Code, 2D Data matrix, 1D Code, RFID, OCR processable code, URL's and plain text, etc.) and sent it to the user via a messaging system, such as SMS, email, etc. by the gateway. After the 2D code is scanned by a scanning device, connect to, e.g., a remote troubleshooting knowledge system, and it may provide the instructions through a document, instruction film, live chat, display instructions, etc. to resolve the problem.

Of course, 2D-code and QR-code are given as examples, the label may contain other types of written and visual information which can include above exemplified information.

The terminal 60 may comprise any type of handheld terminal, such as a Personal Digital Assistant (PDA), Industrial Mobile Barcode Scanner PDA, a smartphone, a tablet, a scanner, etc.

Data that may be transmitted between the printer devices and the gateway computer and the cloud computer may for example comprise:
Real-time/near real-time data:
  The information which is available from the printer/device/edge to represent the current state,
Historical data:
  Any information representing the earlier status of the printer/device or edge node. This information does not need to be real-time data and may span across any of the time windows spanning seconds to minutes to hours to weeks to months of duration.

Thus, three different varieties of data may mainly be transmitted:
Sensor information: data coming out of the printers namely sensor information. For example, temperature sensor of the ink, provides the ink temperature while the printer is in the powered-on state.
Diagnostic data: represents the data which could help to diagnose the printer in case of issue. Diagnostics data contain, sub assembly information, ink circuit information and hydraulic information.
Configuration data: represents the printer setting such as job configuration which would help to configure the job which would be printer on the substrate for example, alignment, pixel density, speed, drops per character.
Operator usage data: Represents the user inputs/settings/operation on the printer.

The real-time/near real-time data usage may for example comprise: if there is any print quality issue of the print will be fed to the edge computer with the help of vision system and identities as quality is bad based on the missing dots, the edge can decide to inform and/or command the printer to purge the print head.

The historical data processing and analysis: collect the printer information about the operator handling printer based on the multiple events/incidents of this at the cloud, we can analyze and/or send proactive message to the customer to corrective actions and to educate customer to handle the equipment correctly.

These and similar data exchanges may apply to all disclosed embodiments.

Figure 7:
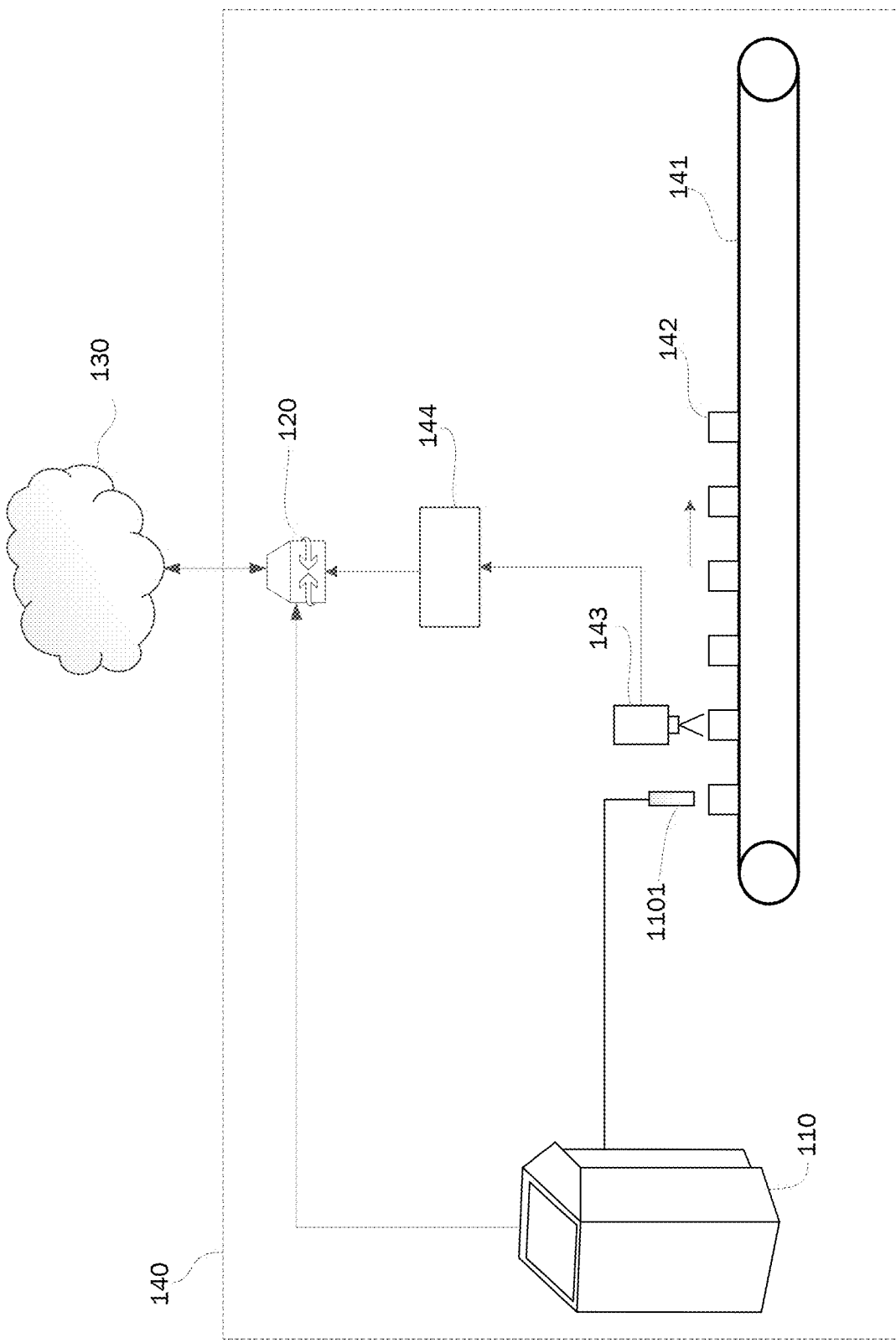
FIG. 7 illustrates an example of a production line incorporation a system according to one embodiment.

FIG. 7 is schematics of another system incorporating the teachings.

An industrial printer 110 comprises a print head 1101 arranged at a production conveyor belt 141. A number of objects or products 142, to be marked, pass by the print head 1101 on the conveyer belt 141 and are provided with an appropriate print or mark. A vision sensor or camera 143 is arranged to collect images of the prints on the object in real-time and transmits it to a controller or a vision system 144, which may analyze the recorded image or provide it to the edge computer 120. The vison camera 143 may also be directly connected to the gateway and controlled by the same. The edge computer 120 analyses the result of the image analyses or directly the image of the prints to detect deficiencies in the prints, such as quality, content, color, intensity, etc., to determine if there is an issue with the industrial printer/print head 1101. The edge computer in the production line processes all the product print images coming from the vision system in near real time. It may process or execute vision analytics and feedback the result of the analyses of the print quality to a production line controller, which enables to accept or reject the product. Due to the low latency of the gateway, this is an advantage using the edge approach in this case. Using edge computing or any low latency computing, acceptance or rejection of the products in near real time is possible and relatively superior to higher latency computing such as cloud computing, e.g., due to the high speed of the production line, even though it may be possible to do faster assessment at the cloud. The results from the analyses may be provided to cloud 130 and stored in the cloud database.

Figure 8:
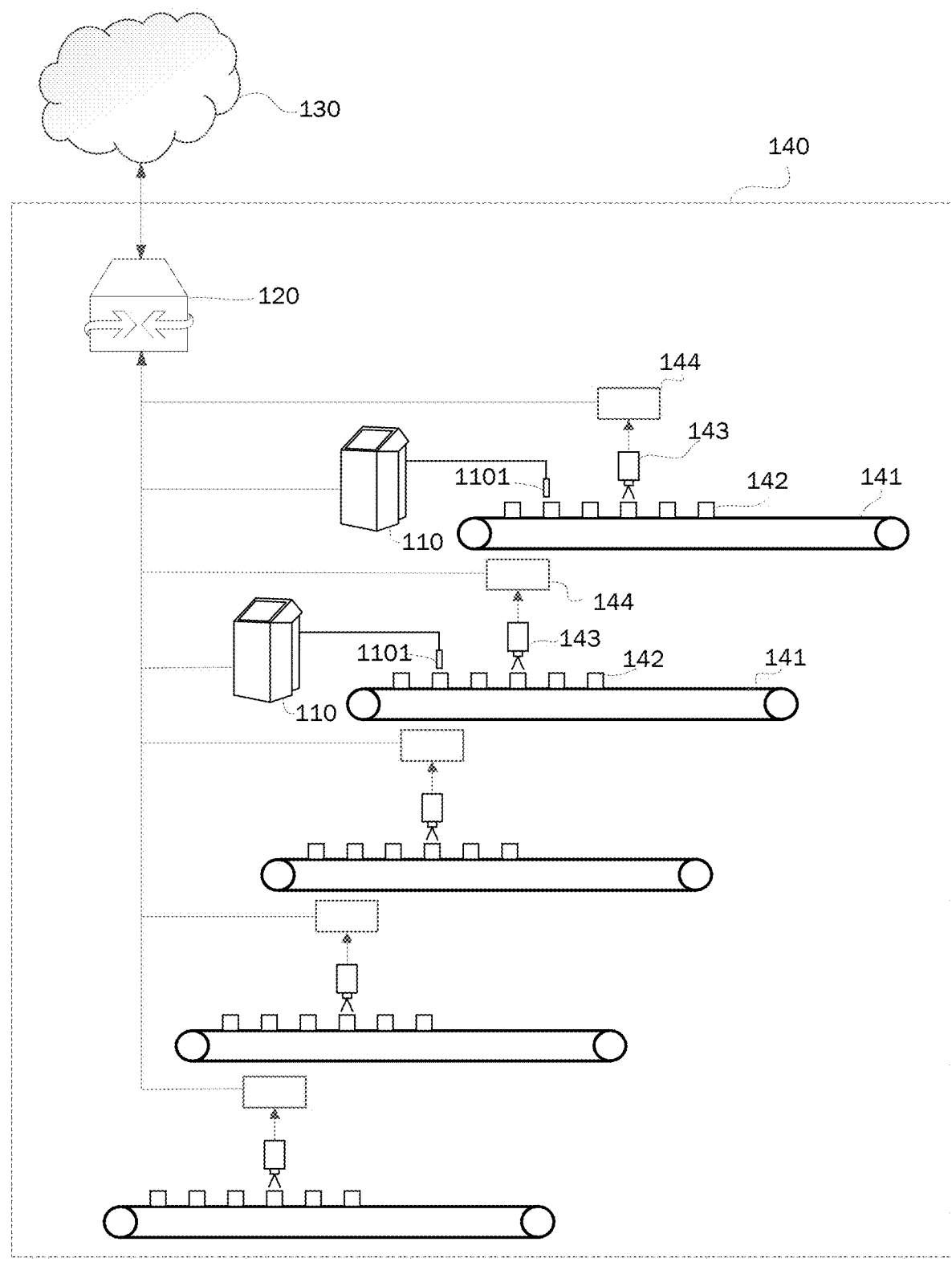
FIG. 8 illustrates a second example of a production line incorporation a system according to one embodiment.

FIG. 8 illustrates another embodiment of a production line in which the system 100 is implemented. In the production site 140, a large production is deployed with multiple production lines 141. Each production line 141 is provided with a vision system 144; 143, as described in conjunction with the embodiment of FIG. 7. Not all printer devices 110 and corresponding printer heads 1101 are illustrated in this example and each line may operate as described in conjunction with the embodiment of FIG. 7. Obviously, the amount of vision related data collected at the site will becomes substantial in size and pushing that data to a cloud computer for analysis becomes a bottleneck, e.g., due to network delays and data size traffic. In this case, the edge computer 120 adds a critical piece for analyzing the vision data, which accumulated becomes large data size.

In the edge computer, it is not only possible to obtain in near real-time data from the printers, but also obtain diagnostic/sensor information from, e.g., the Programmable Logic Controllers (PLCs) or control system from the production line. By analyzing the diagnostic/sensor information of the PLCs and control system, it may be possible to finetune and also near real-time resolve the issues on the production line to keep the entire production up time at a better rate.

The edge computing can process and handle near real-time data analytics. Edge computer processed (stage 1 processed) and historical data analytics will be done at cloud. As the storage on the cloud may be very large or popularly called "unlimited", it is possible to perform major part or all the historical data analytics in cloud computer. Consequently, this the hybrid approach, i.e., handling near real time issues on the edge computer and non-real time data analytics in cloud computer keeps the system in optimal mode to respond back to the production line in an optimized way.

Figure 9:
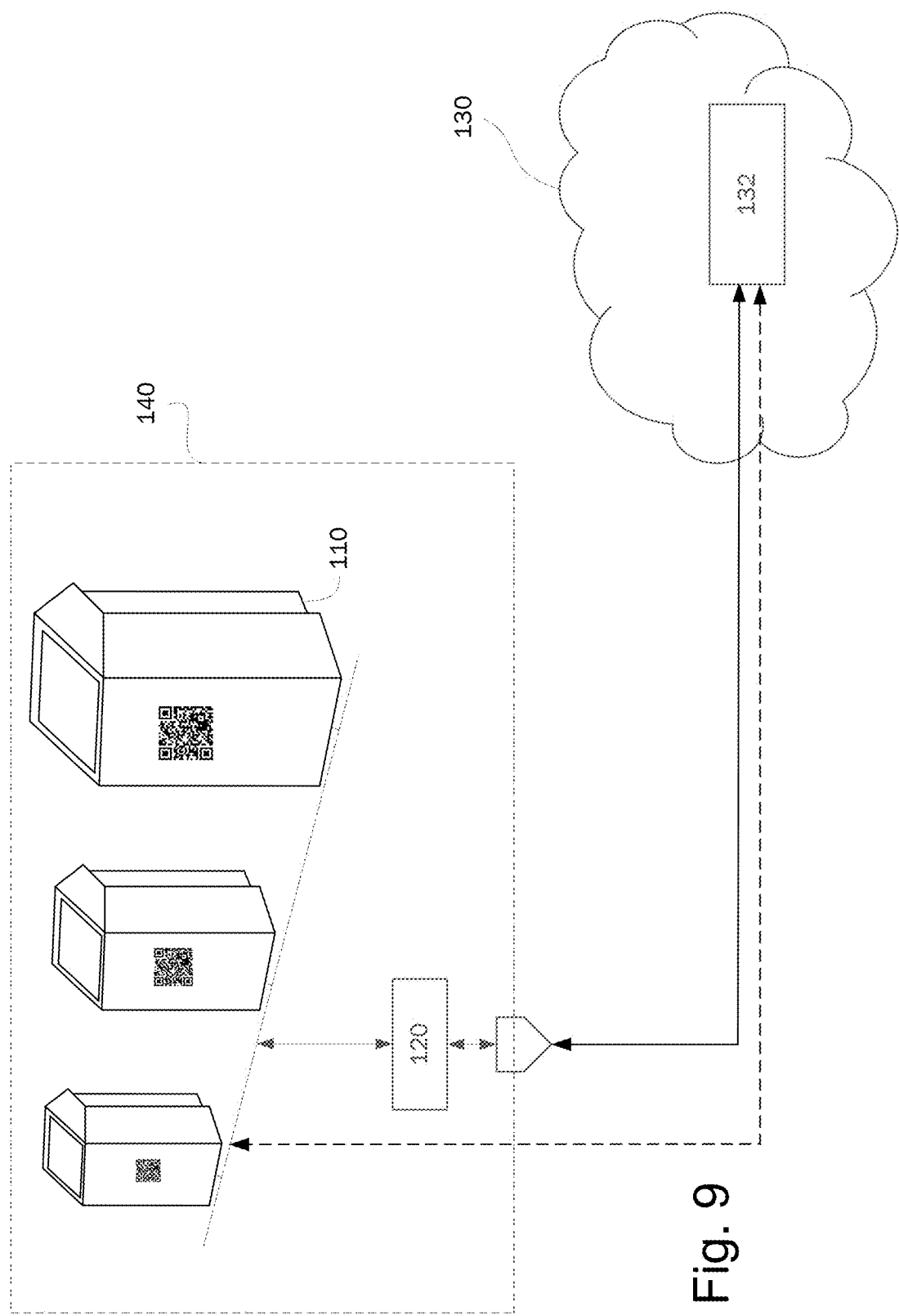
FIG. 9 illustrates an example of a connection of printer devices to edge node and cloud node according to one embodiment.

Another example of staged processing, where processing is firstly conducted by the edge computer 120 and secondly in the cloud computer 132 is illustrated in the embodiment of FIG. 9. FIG. 9 depicts the processing actions in both units, i.e., the edge computer 120 and the cloud computer 132.

In one situation, consider a diagnostic parameter, e.g., X, of a printer 110 is varying and exceeds a defined threshold. This information can be process near real-time inside the gateway computer and feed, e.g., correction signal or instructions to correct the printer settings to return to the normal state.

The number of thresholds exceeded, obtained by the gateway, can be forwarded to cloud computer 132, which can monitor how many times this behavior is occurring in the printer and inform the user to carry out maintenance due to repeated falling of X parameter outside the threshold.

In a second exemplary situation, consider the production system printing on a primary product at very high speed. An image processing engine at the edge computer can monitor the image quality of the printed item. Consider the quality of the printed item will be valid only if it matches a quality grading on 95%+. Once the production is started and assuming that the quality grading of the image is at 99% and keeps falling e.g., by 0.5 every 6 hours. The system can be tuned back to original quality, e.g., by tuning a printhead and/or other sensor values. The information on the degradation of the quality may be provided continuously to the cloud computer. There may be a need for cleaning the printhead and maintenance, if the quality falls below, e.g., 95% and 5 times consistently each day. The cloud computer can keep track of this information due to limitation of data storage at the edge computer. The cloud data processing engine can detect if the above case becomes valid and can inform the user to raise an alert and stop the production. To summarize, instantaneous data processing is handled by the gateway computer at a first stage, and prolonged processing of edge will be analyzed at the cloud on the stage two and appropriate actions are taken.

Figure 10:
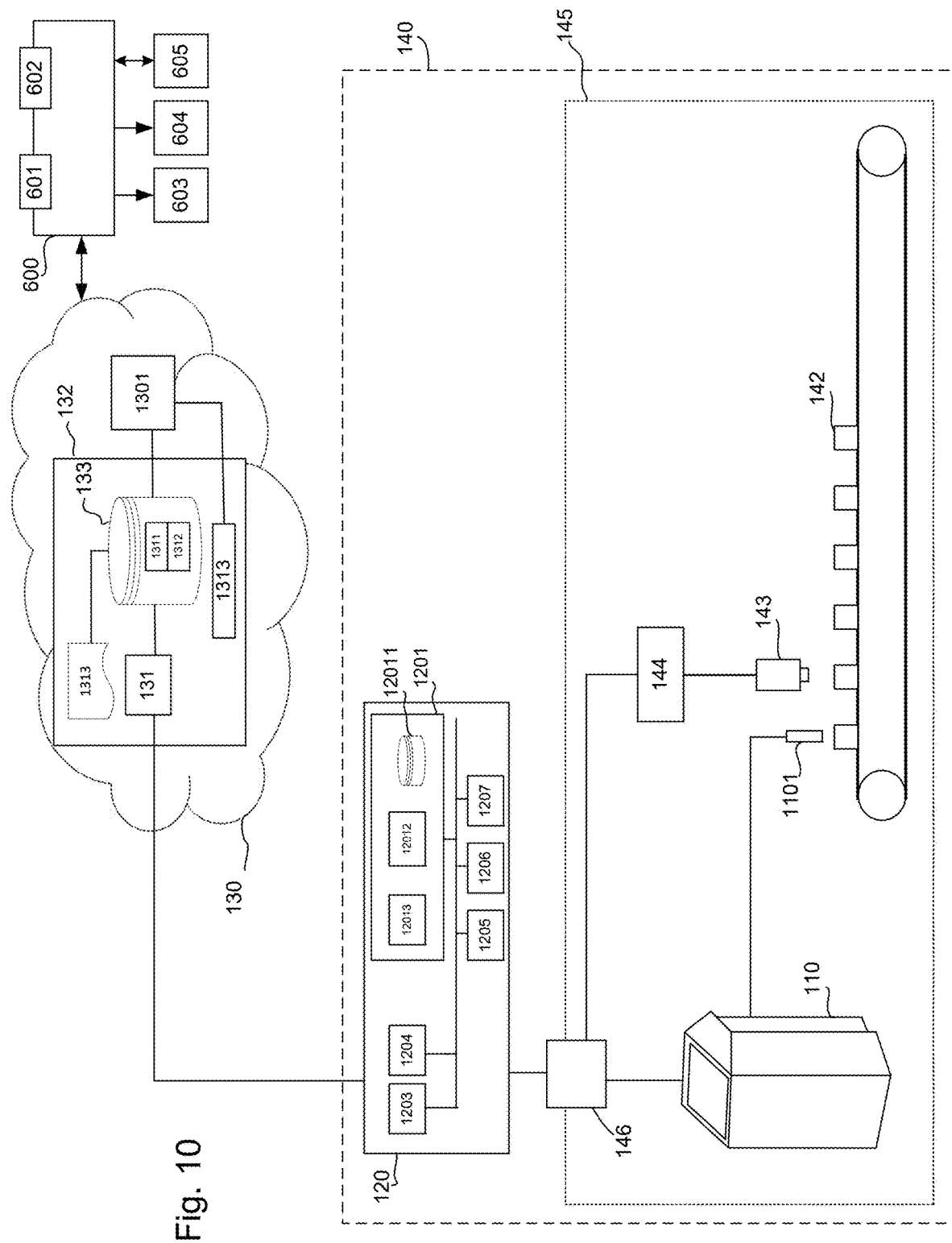
FIG. 10 is an example of a production line connected to an edge node and cloud node in more detail, according to one embodiment.

FIG. 10 illustrates a so-called hybrid system according to one aspect of the of remote services described herein in more detail. The production line 145 in a production site 140 comprises a printer device 110 including a printer head 1101. The printer device and the print head may comprise sensors for detecting operational parameters. The actual diagnostic/configuration/fault information collected from printer operating system, the printer device or print controller may comprise memory (internal storage) data in which configuration, runtime and other information is stored to operate the printer. A vision system comprising a camera 143 and controller 144 is arranged to monitor marks on the products 142. The printer device and vision controller or integrated sensors in these devices are connected to the edge node 120 through a network 146.

The edge node 120, in addition to the processing blocks described earlier, may host edge computer 1201, dedicated client applications 1203, such as External printer Controller® for print management and driver applications 1204, for connecting to cloud applications. Optionally, application gateways, such as External printer controller Gateway can be run with head/headless mode (Remote Web page to configure the External printer controller and DDIoT Runtime).

The edge computer 1201, may also comprise a storage 12011, insight data 12012 and analytics engine 12013. The edge computer may host the service program which is responsible for communicating with cloud from the gateway. It may also ensure that data is stored offline in the memory, e.g., in case of network disconnection. The edge computer may communicate with display driver 1205, execute interface programs 1206 for command to get the diagnostic/config/fault information and web-based protocol (REST interface) to access diagnostic/config/fault information and process 1207 analytic results.

In the cloud 130, the cloud gateway 131 provides secured communication network on the resources of the cloud platform components on the cloud computer (analytics engine) 132. The cloud database 131 may store insights 1311 and analytics data 1312. The database may also comprise data 1313 which maps to printer: diagnostics parameters, runtime parameters and fault/warning parameters. An active directory 1313 may be implemented as an authentication mechanism for every user who accesses the database. A dashboard interface 1301 for users may be implemented for accessing and management of the cloud operations. Additionally, an alert engine may be included in the cloud allowing sending messages (E-mail, SMS, etc.) to users, operators and printer manufacturer.

The cloud may also be in communication with a customer portal 600. The customer portal may comprise helpdesk connectivity 601 and fleet view 602. The customer portal may be configured to communicate with:

Consumable management 603, which can be an online portal where customer can go and buy consumables and spare parts, Troubleshooting portal 604, e.g., a third-party (AI) web-based documentation tool which provided customer solution documentation about printer and faults to the user, Customer warranty information 605, which may be Enterprise Resource Planning of manufacturer comprising information on customer purchase printer information, printer warranty and service contract information and customer master data.

The data exchange between the cloud and the portal may comprise:

From customer portal to the cloud: runtime data and information about equipment warranty.

From cloud to the portal: runtime data including faults and errors to be used by the troubleshooting portal.

In previously described embodiments the cloud computing may comprise dedicated applications or comprise a cloud computing service created by other service providers, such as Microsoft Azure®, Amazon Web Services, Google Cloud, IBM Cloud, Oracle Cloud Infrastructure, Cloud Foundry, IoT platforms, etc., which allow building, testing, deploying and managing applications and services through managed data centers.

In some embodiments, alerts regarding printer status and operations may be provided to the user, the operator or a helpdesk 601 associated with the system 100. Alerts may be provided as SMS, email, web browser notification, dashboard notification, or the like. In some embodiments, alerts or notifications to the user may be constructed including a video, audio, Augmented Reality (AR) or Virtual Reality (VR) content.

In some embodiments, dashboards displaying printer status and alerts may be utilized on the user or operator desktop, tablet, mobile phone or production floor monitor. In some embodiments, users will access a graphical user interface to view alerts or notifications, or other status information related to system 100. The user interface may display or visualize a problem with a printer. Different types of visualization aids, such as colors, icons and images with different sizes and shapes are used to simplify and streamline the perception of the alerts and messages.

In some embodiments, the customer portal 600 is configured to enable virtual digital assistance. The virtual digital assistant can be located at the facility on the production floor and be voice responsive to provide status and oversight information and all the other capabilities of the portal 600 via voice command. The virtual digital assistant can be enabled for commands and voice control in multiple languages. The virtual digital assistant can also control printer operation using voice commands. The virtual digital assistant can provide helpdesk like functionality, where the assistant can trouble shoot based on a script or other helpdesk tasks.

In some embodiments, the customer portal 600 is visualized in an interactive real-time dashboard on the production floor, providing easy visual identification of printer fleet status and operation, alerts or faults, notifications and other features that allow an end user to quickly view information related to the printer fleet without having to access the customer portal 600.

Figure 14:
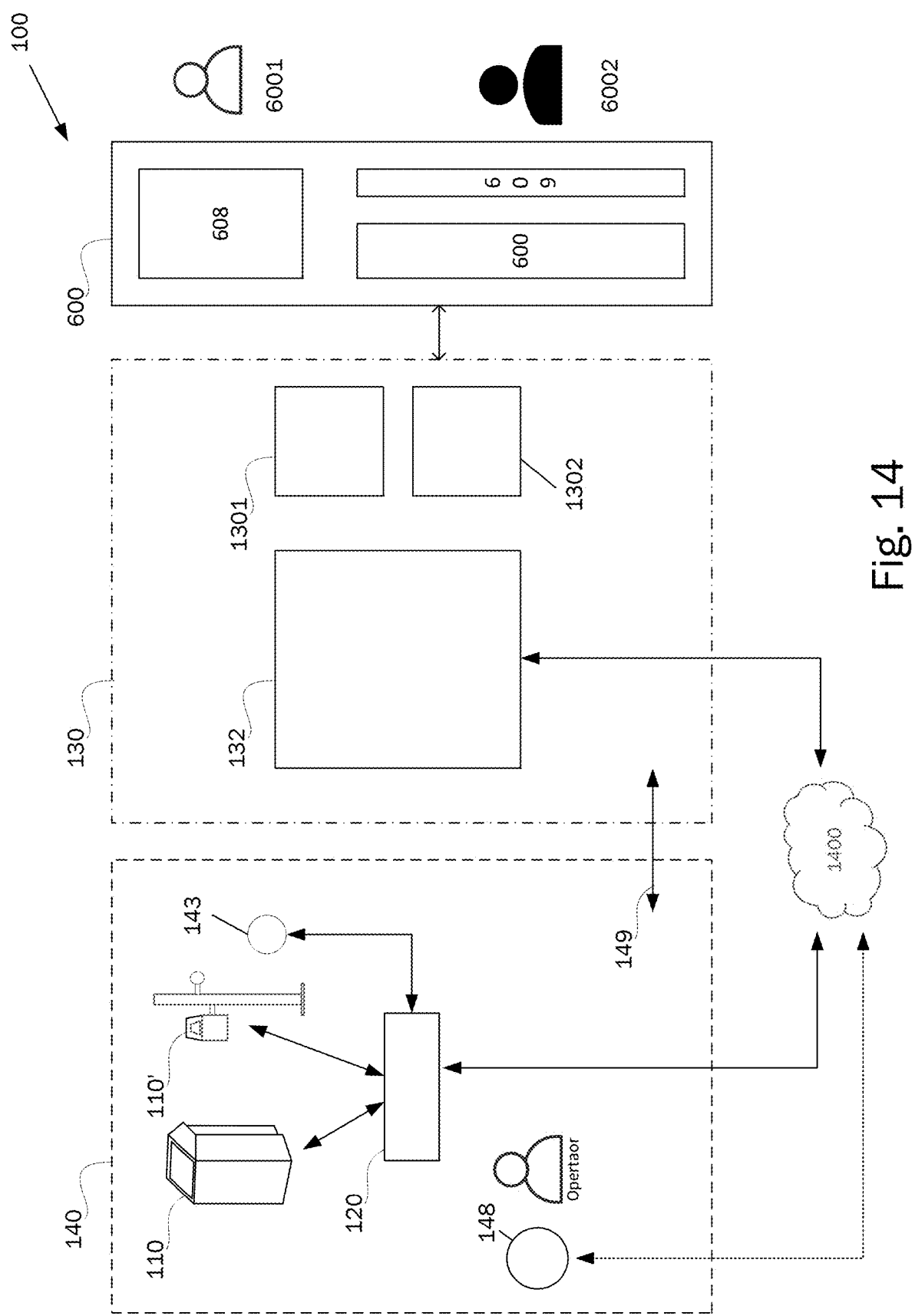
FIG. 14 depicts another embodiment of a remote service environment.

FIG. 14 depicts another embodiment of a remote service environment. The system 100 comprises one or several printers 110 and 110', e.g., an edge gateway 120 and a cloud computing system 130. The printers 110, 110' and sensor(s)/vision cameras 143 are connected to and communicate with the gateway 120 inside the production site premises or a factory 140, and the gateway 120 is connected to the cloud computing system 130 via a secure connection 149. The gateway may also be outside or nearby the productions site.

The edge gateway 120 is capable of hosting and communicating with multiple connected printers via a network connection. The network connections may comprise wireless, wired or telecom-based communication.

In the cloud 130, the cloud gateway (not shown) provides secured communication network on the resources of the cloud platform components on the cloud computer (analytics engine) 132. The dashboard interface 1301 for admin is implemented for accessing and management of the cloud operations. A remote services portal 1302 is provides remote services as described earlier. Additionally, an alert engine is included in the cloud allowing sending messages (E-mail, SMS, etc.) to users, operators and printer manufacturer.

A user side, customer portal 600 and browsers allow helpdesk 6001 and customer 6002 connectivity to the cloud.

According to this embodiment, a service 1400, e.g., on-demand cloud computing platforms and APIs is provided. In this the cloud computing web service 1400 provides distributed computing processing capacity and software tools via server for voice processing and voice recognition capabilities. The service 1400 is configured to receive alerts or related information from the gateway 120 for printers and sensors and cloud computer 132 and process and store them. Consequently, an operator for example may access cloud 140 services and receive remote service information, status, give operational commands from/to cloud using voice commands via one or several voice-based echo devices 148 in the production site. This provides capabilities such as hands free, audible notification, no need of fixed attention, no dedicated observer and freedom installation abilities. ALEXA®, GOOGLE HOME®, and SIRI® are examples of such a voice-based systems and of course other presently available or feature systems can be used.

Figure 11:
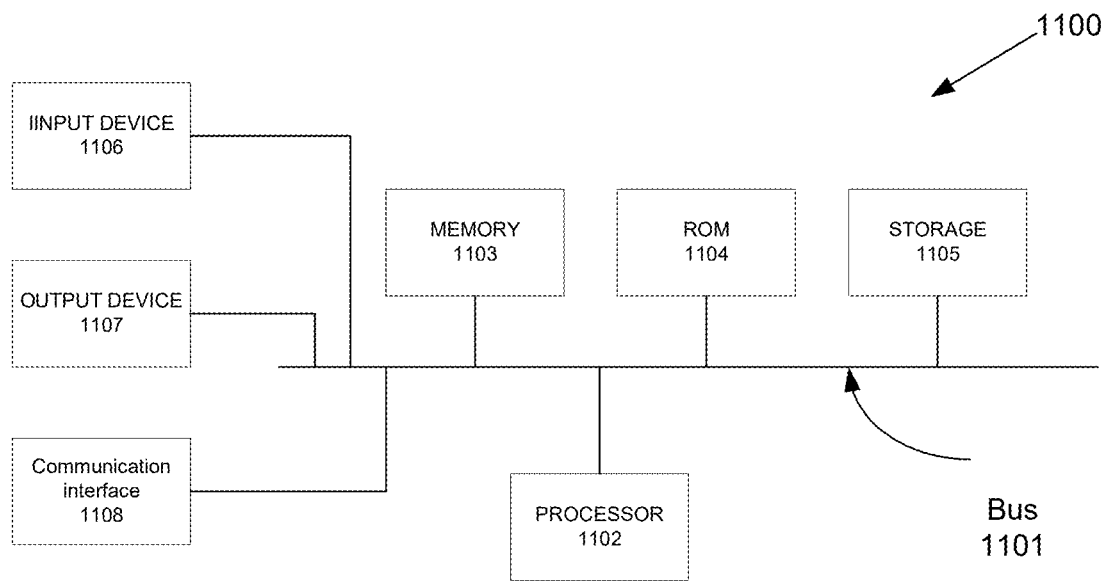
FIG. 11 illustrates schematically an edge computer device according to one embodiment.

FIG. 11 is a diagram of an edge node gateway/computer 1100, used in systems described herein. The computer 1100 may include a bus 1101, one or more processors 1102, a memory 1103, a read only memory (ROM) 1104, a storage device 1105, an input device 1106, an output device 1107, and a communication interface 1108. Bus 1101 permits communication among the components of the computer 1100. The computer 1100 may also include one or more power supplies (not shown). One skilled in the art would recognize that computer 1100 may be configured in a number of other ways and may include other or different elements.

The processor 1102 may include any type of processor or microprocessor that interprets and executes instructions. The processor is configured by programming instructions on non-transient computer readable media, such as the memory 1103 which may include a random-access memory (RAM) or another dynamic storage device that stores information and instructions for execution by processor 1102. Memory 1103 may also be used to store temporary variables or other intermediate information during execution of instructions by processor 1102.

ROM 1104 may include a conventional ROM device and/or another static storage device that stores static information and instructions for processor 1102. Storage device 1105 may include any magnetic, optical or solid-state disk and its corresponding drive for storing information and instructions. The storage device 1105 may also include a flash memory (e.g., an electrically erasable programmable read only memory (EEPROM)) device for storing information and instructions.

Input device 1106 may include one or more conventional mechanisms that permit a user to input information to the computer 1100, such as a keyboard, a keypad, a directional pad, a mouse, a pen, voice recognition, a touchscreen and/or biometric mechanisms, etc. Output device 1107 may include one or more conventional mechanisms that output information to the user, including a display, a printer, one or more speakers, etc. Communication interface 1108 may include any transceiver-like mechanism that enables computer 1100 to communicate with other devices and/or systems. For example, communication interface 1108 may include a modem or an Ethernet interface to a LAN. Alternatively, or additionally, communication interface 1108 may include other mechanisms for communicating via a network, such as a wireless network. For example, communication interface may include a radio frequency (RF) transmitter and receiver and one or more antennas for transmitting and receiving RF data. The communication interface may be configured to communicate with printer devices, vision system and the cloud computing interface.

The computer 1100, provides a platform through which relevant data is sent and received from the connected devices, e.g., through a network. The relevant data including diagnostic data, instructions and information. The computer 1100 may also display information associated with the connected devices to a user of computer 1100 in a graphical format. According to an implementation, computer 1100 may perform various processes in response to processor 1102 executing sequences of instructions contained in memory 1103. Such instructions may be read into memory 1103 from another computer-readable medium, such as storage device 1105, or from a separate device via communication interface 1108. It should be understood that a computer-readable medium may include one or more memory devices or carrier waves. Execution of the sequences of instructions contained in memory 1103 causes processor 1102 to perform the acts that have been described earlier. In alternative embodiments, hard-wired circuitry may be used in place of or in combination with software instructions to implement aspects consistent with the capabilities of system 100. Thus, the capabilities of system 100 is not limited to any specific combination of hardware circuitry and software.

Figure 12:
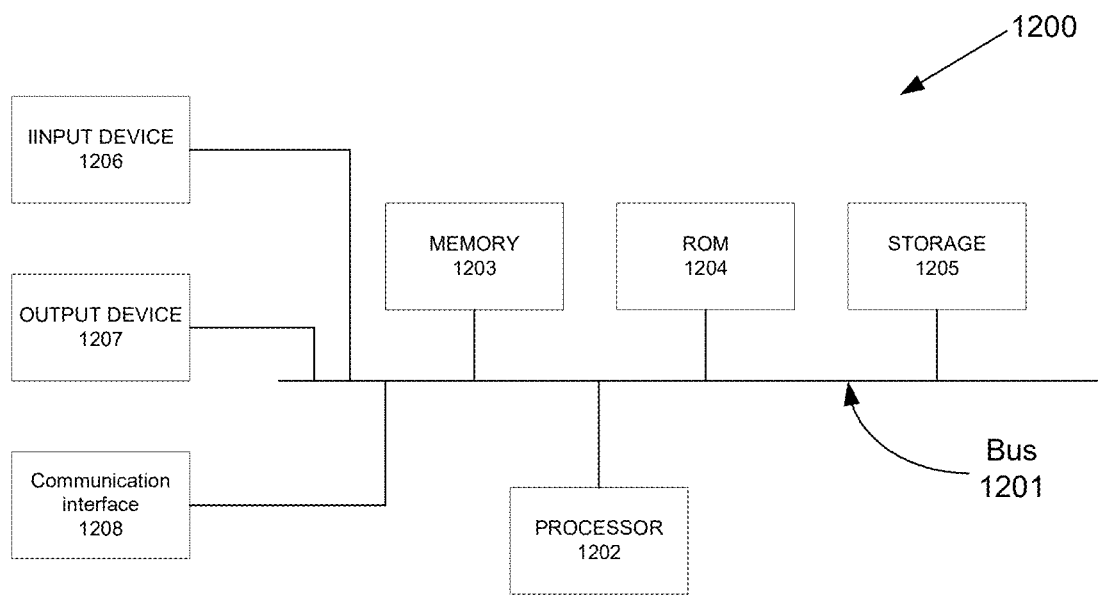
FIG. 12 illustrates schematically a cloud computer device according to one embodiment.

FIG. 12 is a diagram of a cloud computer 1200, used in systems described herein. The computer 1200 may include a bus 1201, one or more processors 1202, a memory 1203, a read only memory (ROM) 1204, a storage device 1205, an input device 1206, an output device 1207, and a communication interface 1208. Bus 1201 permits communication among the components of the computer 1200. The computer 1200 may also include one or more power supplies (not shown). One skilled in the art would recognize that computer 1200 may be configured in several other ways and may include other or different elements.

The processor 1202 may include any type of processor or microprocessor that interprets and executes instructions. The processor is configured by programming instructions on non-transient computer readable media, such as the memory 1203 which may include a random-access memory (RAM) or another dynamic storage device that stores information and instructions for execution by the processor 1202. The memory 1203 may also be used to store temporary variables or other intermediate information during execution of instructions by the processor 1202.

ROM 1204 may include a conventional ROM device and/or another static storage device that stores static information and instructions for processor 1202. Storage device 1205 may include any magnetic, optical or solid-state disk and its corresponding drive for storing information and instructions. The storage device 1205 may also include a flash memory (e.g., an electrically erasable programmable read only memory (EEPROM)) device for storing information and instructions.

Input device 1206 may include one or more conventional mechanisms that permit a user to input information to the computer 1200, such as a keyboard, a keypad, a directional pad, a mouse, a pen, voice recognition, a touchscreen and/or biometric mechanisms, etc. Output device 1207 may include one or more conventional mechanisms that output information to the user, including a display, a printer, one or more speakers, etc. Communication interface 1208 may include any transceiver-like mechanism that enables computer 1200 to communicate with other devices and/or systems. For example, communication interface 1208 may include a modem or an Ethernet interface to a LAN. Alternatively, or additionally, communication interface 1208 may include other mechanisms for communicating via a network, such as a wireless network. For example, communication interface may include a radio frequency (RF) transmitter and receiver and one or more antennas for transmitting and receiving RF data. The communication interface may be configured to communicate with printer devices, vision system and the cloud computing interface.

The computer 1200 provides a platform through which relevant data is sent and received from the edge computer and connected devices, e.g., through a network. The relevant data including diagnostic data, instructions and information. The computer 1200 may also display information associated with the connected devices to a user of computer 1200 in a graphical format. According to an implementation, computer 1200 may perform various processes in response to processor 1202 executing sequences of instructions contained in memory 1203. Such instructions may be read into memory 1203 from another computer-readable medium, such as storage device 1205, or from a separate device via communication interface 1208. A computer-readable medium may include one or more memory devices or carrier waves. Execution of the sequences of instructions contained in memory 1203 causes processor 1202 to perform the acts that have been described earlier. In alternative embodiments, hard-wired circuitry may be used in place of or in combination with software instructions to implement aspects consistent with the capabilities of system 100. Thus, the capabilities of system 100 are not limited to any specific combination of hardware circuitry and software.

Figure 13:
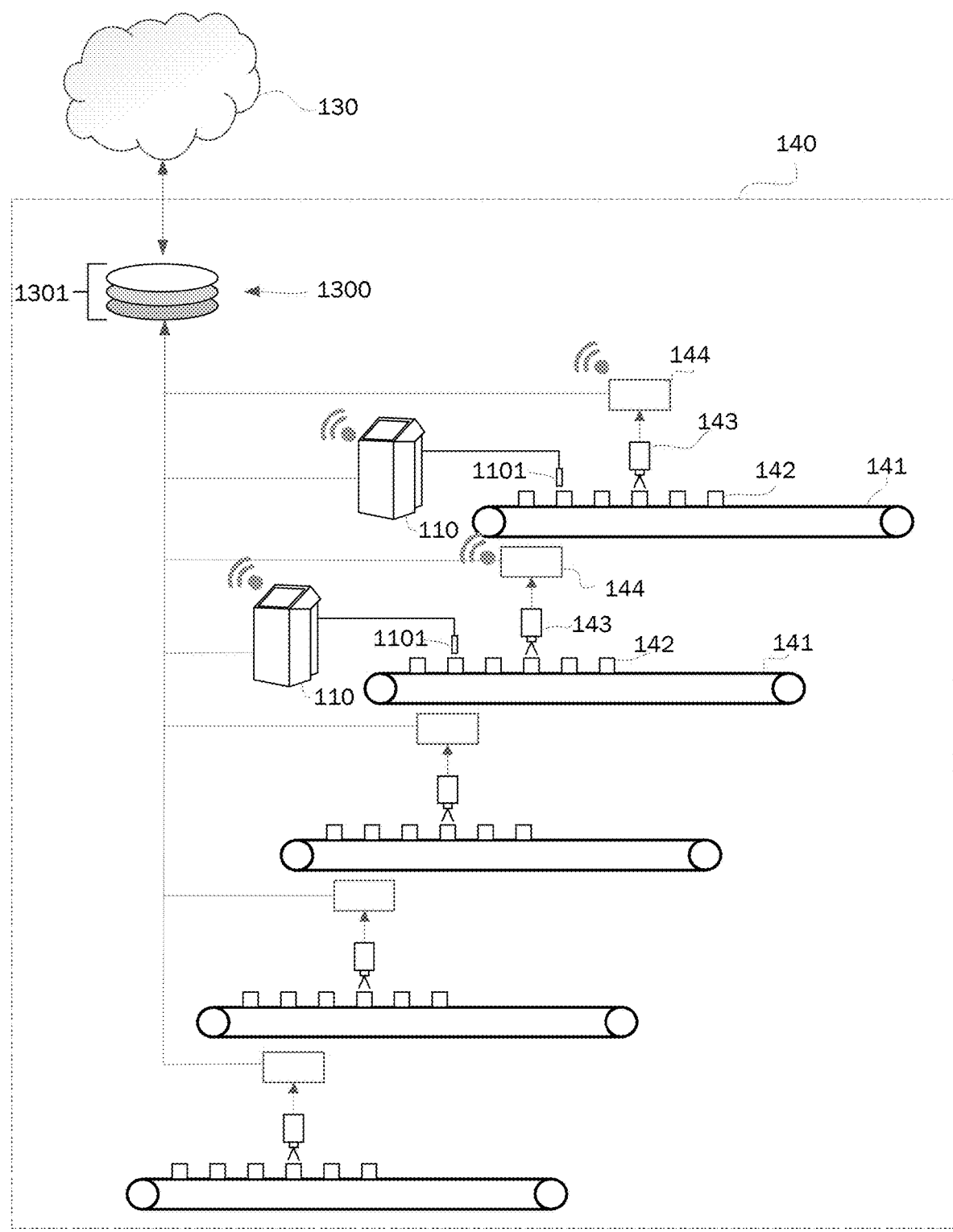
FIG. 13 illustrates schematically another embodiment of a production line.

FIG. 13 illustrates another embodiment of a production line in which the system 100 is implemented. In the production site 140, a large production is deployed with multiple production lines 141. Each production line 141 is provided with a vision system 144; 143, as described in conjunction with the embodiment of FIG. 7. Not all printer devices 110 and corresponding printer heads 1101 are illustrated in this example and each line may operate as described in conjunction with the embodiment of FIG. 7. The amount of vision related data collected at the site will becomes substantial in size and pushing that data to a cloud computer for analysis becomes a bottleneck over a typical network, due to network delays and data size traffic. In this embodiment, each printer 110 and each vision system is equipped with a sim card or otherwise enabled for cellular communication 1300, for example via 5G communication.

In some embodiments, the production line system deployment is mapped to a customized 5G slice among 5G slices 1301 in a 5G networking layer 1300, which provides connectivity and data processing tailored to the specific networking requirements of the production line system deployment, for example as related to collecting vision related data. The customized network capabilities provided for the production line system include, but are not limited to, data speed, quality, latency, reliability, security, and services, among others. The customized 5G slice includes one or more slices in a 5G networking layer, each slice or combination of slices configured to facilitate saving resources including bandwidth, energy, memory space, processing power, and time. 5G or $5^{th}$ generation cellular network is given as an example and other broadband cellular networks presently available or new generations may as well be employed as communication network.

In some embodiments, the production line system deployment is mapped to a highly secure, reliable, and/or high latency slice providing optimal perpetual training, evaluation, and updates of the vision systems and processing deployed by the production line system. For example, in some embodiments, the production line system deployment relies on receiving timely and secure printer alerts and history. Thus, mapping the production line system to a custom 5G slice allows for real-time printer alert detection and scalability, despite the computational complexity and the large data size.

Utilizing the customized 5G slice, it is not only possible to obtain in near real-time data from the printers, but also obtain diagnostic/sensor information from, e.g., the Programmable Logic Controllers (PLCs) or control system from the production line. By analyzing the diagnostic/sensor information of the PLCs and control system, it may be possible to finetune and also near real-time resolve the issues on the production line to keep the entire production up time at a better rate.

Utilizing the customized 5G slice enables processing and handling near real-time data analytics. As the storage on the cloud may be very large or popularly called "unlimited", it is possible to perform major part or all the historical data analytics in cloud computer. Consequently, the hybrid approach handles near real time issues utilizing a customized 5G slice and non-real time data analytics in cloud computer keeps the system in optimal mode to respond back to the production line in an optimized way.

Figure 15:
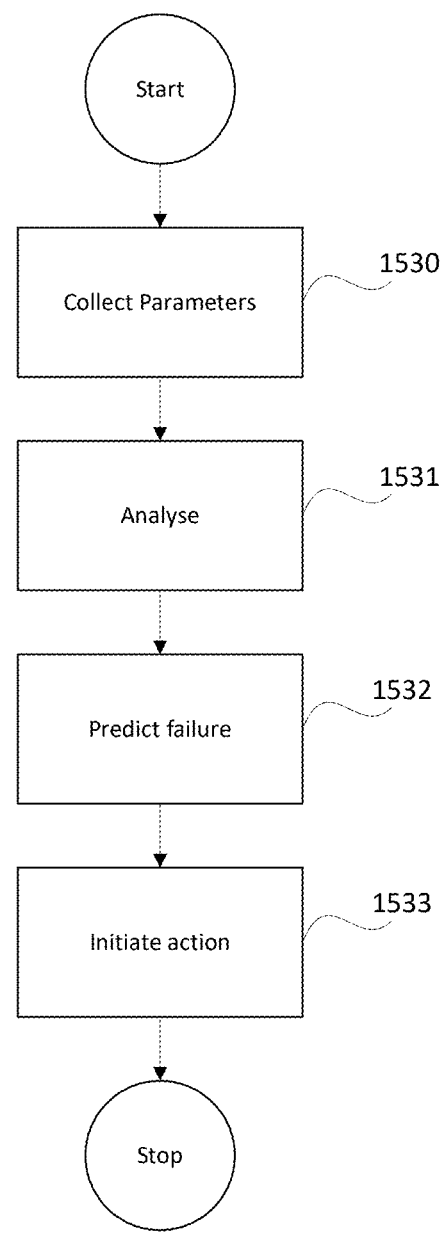
FIG. 15 illustrates exemplary steps of an AI-based system embodiment.

FIG. 15 illustrates exemplary steps of an AI-based system embodiment executed by the processing unit of the computer, e.g., the gateway 140. During a printer's lifetime, critical parameters are acquired in step 1530 and analyzed in step 1531. Based on the trained model, failure may be predicted in step 1532 and an action initiated in step 1533.

For example, in the case of a printer generating an alert related to the jet (printhead) being not well positioned, step 1531 may include determining by the printer that an alert has occurred, and either pushing the alert out to system 100 and/or storing the alert in a log file. The log file is used in the case where the printer is waiting for the system 100 to poll the printer for heartbeat data. In some embodiments, the printer stores a day, a week, a month or more of sensor data or operational data in log files on a regular basis that could be each second, each minute, each hour or each day or something else. The log file data is used to determine service issues, including intelligent advice and predictive failures.

In some embodiments, the gateway polls printer status in real time or near real time (latencies of p seconds to some seconds), or every minute, or another predetermined or preconfigured period of time. In some embodiments, the printer or printer platform may publish an alert or a fault to the gateway. In some embodiments, the printer platform can utilize a TCP/IP protocol to talk to printers. When the printer platform detects a warning or a fault, the platform publishes (real-time framework signal R used for chatting) to a module in the gateway that sends the published message to the gateway, the gateway may process and analyze and send a copy to the cloud, where the message is stored and also sent to a notification service. In some embodiments, the communication protocol between the gateway and the cloud includes AMQP over SSL or the like.

The printer platform identifies that printer has an alert (fault or warning). There may be two types of alerts, warning and fault, and both types are sent from the printer platform to the gateway.

For every alert received, the printer platform processes the alert, cleanses it, and sends it to the gateway, the gateway sends to the cloud for storage in, e.g., JavaScript Object Notation (JSON) format (or any suitable format), and also the notification is sent to a notification service module in the service fabric. If the customer subscribes to notifications, then a communication notification is communicated to the customer, via email, SMS, phone call, voice status or the like. In some embodiments part of alerts received are sent to platform, e.g., depending on customer subscription (e.g., only following one specific module) or printer configuration The predictive module (in the gateway) receives the alert message and searches for appropriate algorithms to apply for the particular alert message. In some embodiments, the algorithms are stored in a lookup table of algorithms and associated to alerts.

Figure 16:
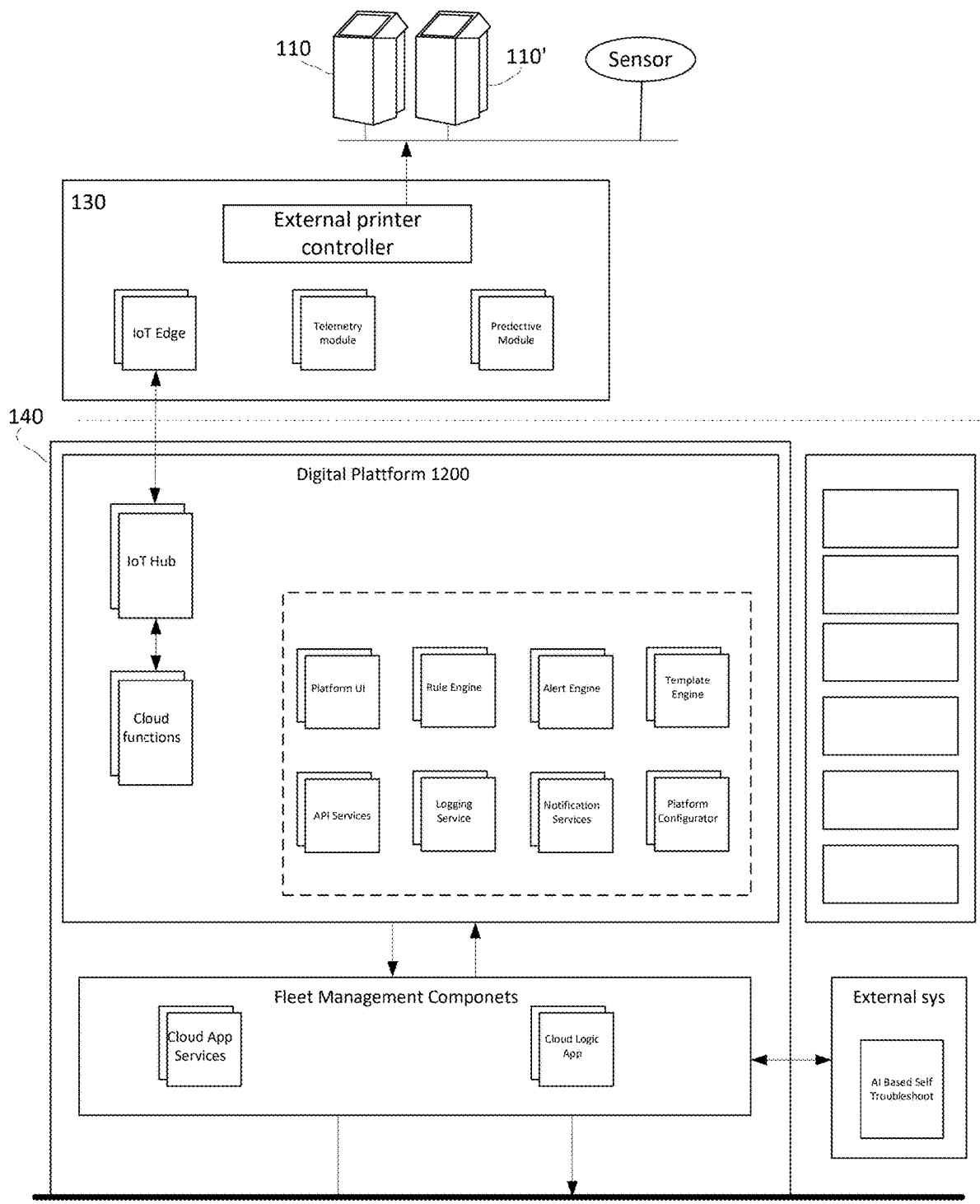
FIG. 16 is depicts an embodiment of a system for predicting operational status of printers.

The system of FIG. 16 aggregates the data on the edge, analyze on the edge and cloud and determines corrective actions.

Primary printers 110 such as CIJ (primary printer, prints directly on the product itself, small character printer), laser printers, DOD (drop on demand) are connected to the gateway 210.

Digital Platform 1200 registers the gateway 130 for the client site and registers the printer (or any connectable device). The platform also provides user management, and device management.

The device management functions for:
Onboarding the gateway
Decommissioning of the gateway
Onboarding the device
Decommissioning of the device
For example, if an alert is generated:
Printer not shut down properly;
Printer stores last two months of data in log files;
Printer determines an alert has occurred;
Printer sends a fault alert to the gateway 130 (status is polled from the gateway, printer sends alerts);

Two types of alerts: warning and fault, both types go from printer to gateway: Gateway receives fault alert, not shut down properly; Gateway sends alert to the cloud 140. Gateway monitors these alerts for a number of days (by monitoring it is meant that gateway checks printer log files for printer not shut down alert, log files have previous fault and alert history, Gateway on a daily basis checks log files of printer).

The alert to the cloud 140 may be a special alert for helpdesk, e.g., for someone to call the printer user and an alert to the cloud.

Detailed Data and process flow for example jet not well positioned, may comprise:

Printer stores last two months (or predetermined period) of data in log files. Data for a number of days may be used to determine service issues.

Printer determines an alert has occurred.

External printer controller (Gateway 130) polls printer status every 1 minutes (or a predetermined period of time);

External printer controller publishes any alert or fault to the gateway;

External printer controller polls the printer a predetermined time period (maybe real time, more often);

External printer controller uses TCP/IP to communicate to printers;

When External printer controller detects a warning or a fault, External printer controller publishes (real-time framework signal R used for chatting) to telemetry module;

telemetry module sends to edge;

Edge sends to IoT hub;

IoT Hub sends to function app (stores to database and sends to notification service)

Communication from gateway to cloud AMQP over SSL may be used;

External printer controller identifies that printer has an alert (fault or warning) (two types of alerts: warning and fault can be used, both types go from printer to gateway);

External printer controller requests an alert from printer in response to Gateway request/polling;

Printer sends alert: "jet not well positioned"—to the gateway;

Gateway receives (fault/warning) alert—jet not well positioned;

For every alert, telemetry module processes the alert, cleanses it;

telemetry module sends it to IoT Edge (communication module for gateway and cloud, sends data securely);

the edge sends through cloud for storage (in JSON format in the database DB);

and telemetry module sends it to notification service in service fabric (if there's a customer subscription, sends out email to customer);

if alert is "jet not well positioned", then telemetry module passes the alert information to predictive module and the IoT Edge;

IoT Edge stores alert information in the cloud;

Predictive module receives the alert "jet not well positioned", checks DB which stores the algorithms to see which algorithm applies to the alert (lookup table of algorithms and associated to alerts);

Predictive module fetches all the log files from the printer and checks log files: if it occurred a number of times in time period, then generates predictive alert;

Predictive module sends predictive alert to IoT edge;

The IoT edge sends the predictive alert to IoT Hub; every message may be a packet, processes it blindly;

The IoT Hub to cloud functions, serverless function, connectivity to database, stores to database and pushes to notification service;

Notification service looks up configuration for customer (DB), whether customer has right to access info, whether customer has email subscription to receive emailed alert;

Notification service checks what printer it belongs to, checks (logged in) customer rights to access that data, checks for whether the customer has subscribed for the event.

Another example data and process flow for alert "Incorrect Print Speed" is described:

Printer sends alert—Incorrect Print Speed

For every alert, the telemetry module processes the alert, cleanses it, and ends it to IoT Edge (communication module for gateway and cloud, sends data securely), the edge sends through cloud for storage (e.g., in JSON format in DB), and sends it to notification service in service fabric (if there's a customer subscription, sends out email to customer)

The telemetry module if alert is "jet not well positioned", then the telemetry module passes that information to predictive module Predictive module receives the alert "jet not well positioned", checks log files if it occurred a number of times in a period, then generates a predictive alert (9010), and sends to IoT edge;

The IoT edge sends the predictive alert to IoT Hub; every message is a packet, processes it blindly;

IoT Hub to cloud functions, serverless function, connectivity to database, stores to database and pushes to notification service Following is an example of data and process flow for closure for alert "Incorrect Print Speed":

Fault and warning, printer has to initiate closing the alert;

User can clear the alert on the printer or fix the issue on the fault on the printer; Fault halts production, warning does not halt production;

Only intelligent advice alerts can be viewed both by customer and helpdesk but can be closed by customer only. They can use the GUI to close the alert and put a closure summary;

External printer controller polls the printer for alert, External printer controller detects change in the state, when External printer controller detects nothing on the printer, External printer controller sends clear event to gateway. Whenever there is an alert, cloud functions query the DB (fault/warning) to create a record for the alert, with status as active. Whenever there is a change of status for an alert, cloud functions query the DB (fault/warning) to create a record for the alert, with status as closed;

Printer sends closure for alert—Incorrect Print Speed; data packet that now has a closing timestamp associated with alert;

For every closure, the telemetry module processes the closure alert, cleanses it, and sends it to IoT Edge (communication module for gateway and cloud, sends data securely), the edge sends through cloud for storage (e.g., in JSON format in DB), and sends it to notification service in service fabric (if there's a customer subscription, sends out email to customer);

The telemetry module if alert is "jet not well positioned", then telemetry module passes that information to predictive module;

The predictive module receives "jet not well positioned", checks log files if it occurred a number of times in a period, such as one week, then it generates predictive alert and sends to the IoT edge;

The IoT edge sends the predictive alert to IoT Hub; every message is a packet, processes it blindly;

The telemetry module is mainly a telemetry processor configured to:

Process status and telemetry data;
Process diagnostics logs; and
Process Maintenance and Consumable logs coming from the gateway (External printer controller) and pass it to cloud via container processing unit.

The various embodiments of the disclosure described herein is described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Solid State Drive (SSD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments or parts can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the system 100 may be implemented at least in part by means of both hardware and software, and that several "means", "units" or "devices" may be represented by the same item of hardware.

The foregoing description of embodiments, have been presented for purposes of illustration and description. The foregoing description is not intended to be exhaustive or to limit embodiments to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the disclosure in various embodiments and with various modifications as are suited to the particular use contemplated. The features of the embodiments described herein may be combined in all possible combinations of methods, apparatus, modules, systems, and computer program products.

The invention claimed is:

1. A system comprising:
    at least one printer configured to be used in a production site;
    at least one detecting device configured to monitor in real-time a functional parameter of the at least one printer;
    an edge node comprising an edge computing device, the edge computing device comprising one or more processors configured by programming instructions on non-transient computer readable media,
    a cloud node comprising a cloud computing device, the cloud computing device comprising one or more processors configured by programming instructions on non-transient computer readable media,
    wherein the one or more processors of the edge computing device are is configured to:
        receive real time data from the printer and/or a detecting device, in real time, said first data comprising the functional parameter of the at least one printer;
        process and analyze the received first real-time data and compare it with internally stored data to generate a first response to the first received data;
        transmit the first response to the at least one printer;
        transmit the first response and received real-time data to the cloud node;
    the cloud computing device is configured to:
        process and analyze the first real-time data from the at least one printer and the first response from the edge computing device by comparing them with historical data and generate a second response with respect to the historical data; and
        provide the second response to a user and/or the edge node;
    wherein the functional parameter comprises one or several of diagnostic data, configuration data, maintenance information, fault/error/warning condition or a quality parameter; wherein:
    the edge node is further configured to transform one or several of the fault, error or warning data into one or several of uniquely identifiable information, the uniquely identifiable information comprising a two-dimensional code, a one-dimensional code, URL's, RFID, OCR's, processable images or plain text information; and
    the edge node is further configured to send the one or several uniquely identifiable information to a user via a message, wherein the uniquely identifiable information is scanned and reconfiguration instructions are downloaded to the printer automatically or instructions are provided to a user.

2. The system of claim 1, wherein the edge node is inside the production site.

3. The system of claim 1, wherein the cloud node is arranged remotely.

4. The system of claim 1, wherein said second response from the cloud computing device is a remote service solution.

5. The system of claim 1, wherein the edge node is configured to provide instructions directly to the printer device for reconfiguring the printer device.

6. The system of claim 1, wherein the edge computer device comprises a processing engine, a device diagnostics aggregator and a validator.

7. The system of claim 6, wherein the processing engine comprises a telemetry processor and an algorithm processor, wherein the telemetry processor is configured to:
 handle publishing of the printer data to cloud node;
 map the printer data to corresponding printer when receiving from multiple printers;
 pass all the processed data to cloud node;
 communicate with one or more printers and/or detecting devices;
 collect printer diagnostics, status and/or maintenance information;
 receive a set of data for each individual system in a non-blocking mode;
 analyze the received set of data via a data query system;
 take suitable action and build an event/notification data;
 transmit event data is sent to cloud node.

8. The system of claim 1, wherein the cloud node comprises a gateway, an analytics engine and a database.

9. The system of claim 8, wherein the database is configured to store historic data from the at least one printer, real-time data received from the edge node and the analytics engine comprises a computer for executing a decision and action application or an AI based application.

10. The system of claim 1, wherein the printer is provided with a label configured to be scanned by a user, translated to instructions allowing the user obtain access to a knowledge database in the cloud node.

11. The system of claim 10, wherein the label comprises a two-dimensional code and comprises a unique id of the printer and/or additional error codes and/or diagnostic information.

12. The system of claim 1, wherein the two-dimensional code is scanned based on which instructions for reconfiguration of the at least one printer are downloaded to the at least one printer automatically.

13. The system of claim 1, further comprising one or several vision systems configured to record an image of a print-out.

14. The system of claim 13, comprising an arrangement configured to analyze the image from the vision system to detect a quality parameter.

15. The system of claim 14, wherein the edge node is configured to with respect to the outcome of the analysis provide instructions to the printer, or a user and forward the instruction and the outcome of the analyze to the cloud node.

16. The system of claim 1, wherein the cloud is configured to, based on multiple instances, analyzes and/or generates a proactive message to a user to make corrective actions and/or generate information for the purpose of educating user to handle the printer correctly.

17. The system of claim 1, wherein the printer is an industrial printer.

18. A computer implemented method of servicing an industrial printer, the method comprising:
 receiving by an edge node computer first real-time data from the industrial printer, and processing the first real-time data from the industrial printer by the edge node computer;
 generating a first instruction for configuration of the industrial printer by the edge node based on a result of validation;
 transmitting the first instruction to the industrial printer and/or an operator of the industrial printer;
 transmitting the first real-time data and the first instruction to a cloud node computer;
 processing by the cloud node computer the real-time data and the first instruction;
 generating a second instruction by the cloud node and storing the real time data, the first instruction and the second instruction in the cloud node;
 wherein the functional parameter comprises one or several of diagnostic data, configuration data, maintenance information, fault/error/warning condition or a quality parameter;
 wherein the edge node is further configured to transform one or several of the fault, error or warning data into one or several of uniquely identifiable information, the uniquely identifiable information comprising a two-dimensional code, a one-dimensional code, URL's, RFID, OCR's, processable images or plain text information; and
 the edge node is further configured to send the one or several uniquely identifiable information to a user via a message, wherein the uniquely identifiable information is scanned and reconfiguration instructions are downloaded to the printer automatically or instructions are provided to a user.

19. The method of claim 18, wherein the real-time information and instructions is forwarded to cloud node using digital codes comprising reference lookup on the cloud node or the code itself represent a service issue and solution.

20. The method of claim 18, wherein the real-time information comprises sensor and/or diagnostic and/or quality parameter and/or configuration data.

21. The method of claim 18, comprising the further steps of:
 scanning a label on the industrial printer, the label comprising a unique id of the industrial printer and/or additional error codes and/or diagnostic information;
 processing and forwarding the scanned image to the cloud node; and
 receiving instructions based on the received scanned information and historical information stored in the cloud node.

22. The method of claim 18, wherein data transmitted between the industrial printer and the edge node and the cloud node comprises one or several of:
 a first real-time or near real-time data, comprising:
  Information that is available from the printer device or edge node to represent a current state;
 historical data, comprising:
 Information representing an earlier status of the printer or edge.

23. The method according to claim 22, the transmitted data further comprises one or several of:
 sensor information;
 diagnostic data;
 configuration data; or
 operator Usage data.

24. An edge node computer in the system according to claim 1 configured to process functional parameters of an industrial printer and provide reconfiguration instructions based on processed functional parameters, the edge node comprising an edge computing device, the edge computing device comprising one or more processors configured by programming instructions on non-transient computer readable media, the edge computing device further comprising:
 a processing engine, a device diagnostics aggregator and a validator; and
 the processing engine comprising a telemetry processor and an algorithm processor.

25. A cloud node computer in the system according to claim 1 configured to process functional parameters of an industrial printer and provide reconfiguration instructions based on processed functional parameters, the cloud node further comprising a gateway, an analytics engine and a database.

26. The printer of the system according to claim 1 comprising a printer head, a print controller and one or several sensors for detecting operational parameters.

* * * * *